United States Patent
Yun

(10) Patent No.: US 11,592,963 B2
(45) Date of Patent: Feb. 28, 2023

(54) TERMINAL, CONTROL METHOD THEREFOR, AND RECORDING MEDIUM IN WHICH PROGRAM FOR IMPLEMENTING METHOD IS RECORDED

(71) Applicant: ENABLE WOW, Seoul (KR)

(72) Inventor: Chui Min Yun, Seoul (KR)

(73) Assignee: ENABLE WOW, Seoul (KR)

( * ) Notice: Subject to any disclaimer, the term of this patent is extended or adjusted under 35 U.S.C. 154(b) by 0 days.

(21) Appl. No.: 17/292,165

(22) PCT Filed: Jan. 28, 2020

(86) PCT No.: PCT/KR2020/001298
§ 371 (c)(1),
(2) Date: May 7, 2021

(87) PCT Pub. No.: WO2021/010558
PCT Pub. Date: Jan. 21, 2021

(65) Prior Publication Data
US 2021/0389849 A1    Dec. 16, 2021

(30) Foreign Application Priority Data
Jul. 16, 2019    (KR) .......................... 10-2019-0085665

(51) Int. Cl.
G06F 3/0482    (2013.01)
G06F 3/04845    (2022.01)
G06F 3/0488    (2022.01)

(52) U.S. Cl.
CPC .......... *G06F 3/0482* (2013.01); *G06F 3/0488* (2013.01); *G06F 3/04845* (2013.01)

(58) Field of Classification Search
CPC .. G06F 3/0482; G06F 3/04845; G06F 3/0488; G06F 3/0481; G06F 3/04842;
(Continued)

(56) References Cited

U.S. PATENT DOCUMENTS 9,658,865 B2    5/2017    Kim et al.
10,108,312 B2 *    10/2018    Kim ..................... G06F 3/04817
(Continued)

FOREIGN PATENT DOCUMENTS

KR    20140099588 A    8/2014
KR    20160016400 A    2/2016
(Continued)

*Primary Examiner* — Shen Shiau
(74) *Attorney, Agent, or Firm* — Morgan, Lewis & Bockius LLP

(57) ABSTRACT

The present invention relates to: a terminal capable of setting a trigger area and outputting additional contents in response to an input of touching the set trigger area; and a control method therefor. The terminal according to the present invention can comprise a touch screen for displaying information and receiving a touch input, and a control unit for performing control so as to output main contents on the touch screen, set a trigger area linked to a plurality of additional contents on the main content, output a list of the plurality of additional contents linked to the trigger area in response to a touch input of touching the trigger area when an edit mode for allowing setting of the trigger area is terminated and a viewer mode is executed, and output first additional contents corresponding to the selected item when any one is selected from the list.

5 Claims, 23 Drawing Sheets

(58) Field of Classification Search
CPC ..... G06F 3/0486; G11B 27/031; G11B 27/34; H04N 21/4725; H04N 21/854; H04N 21/8583; H04N 21/47205
See application file for complete search history.

(56) References Cited

U.S. PATENT DOCUMENTS

| | | |
|---|---|---|
| 2011/0185301 A1 | 7/2011 | Geller et al. |
| 2011/0213655 A1* | 9/2011 | Henkin .................. G06Q 30/00 707/E17.061 |
| 2011/0246929 A1 | 10/2011 | Jones et al. |
| 2012/0072816 A1* | 3/2012 | Rakshit ............... G06F 16/9562 715/205 |
| 2014/0304579 A1* | 10/2014 | Foster ................... G06F 3/0481 715/205 |
| 2015/0302065 A1* | 10/2015 | Kawano .............. G06F 16/9024 707/722 |
| 2015/0371057 A1* | 12/2015 | Ow ......................... H04L 63/10 726/28 |
| 2016/0188558 A1* | 6/2016 | Shikawa ............... G06F 3/0488 715/230 |
| 2016/0370974 A1* | 12/2016 | Stenneth ................. G06T 11/60 |
| 2022/0121355 A1* | 4/2022 | Yun ....................... G06F 3/0486 |

FOREIGN PATENT DOCUMENTS

| | | | | |
|---|---|---|---|---|
| KR | 20180066545 A | * | 6/2018 | ......... G06F 3/04845 |
| WO | WO 2014/200553 A1 | | 12/2014 | |

* cited by examiner

[FIG. 1]
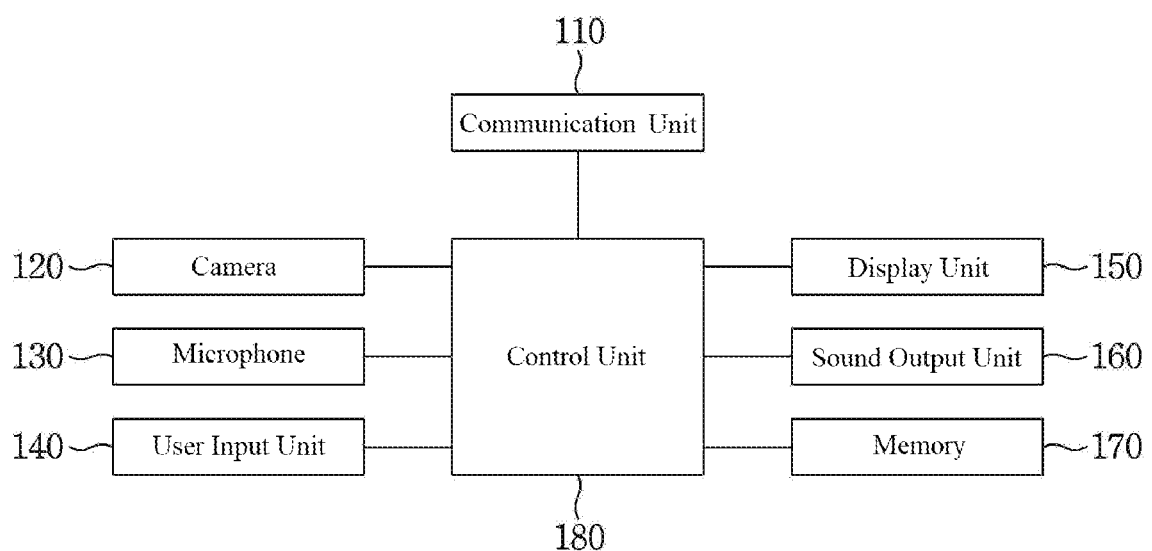

[FIG. 2]
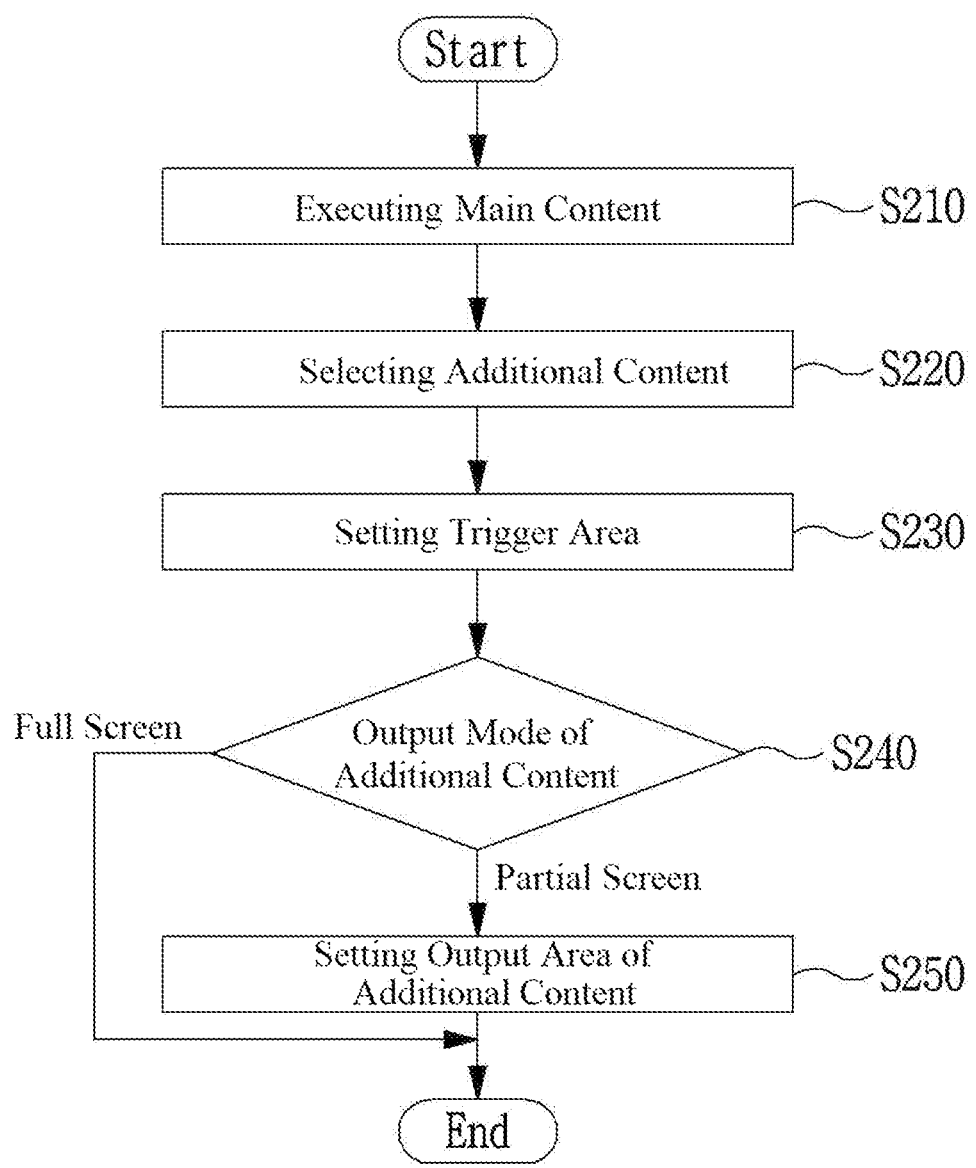

[FIG. 3]
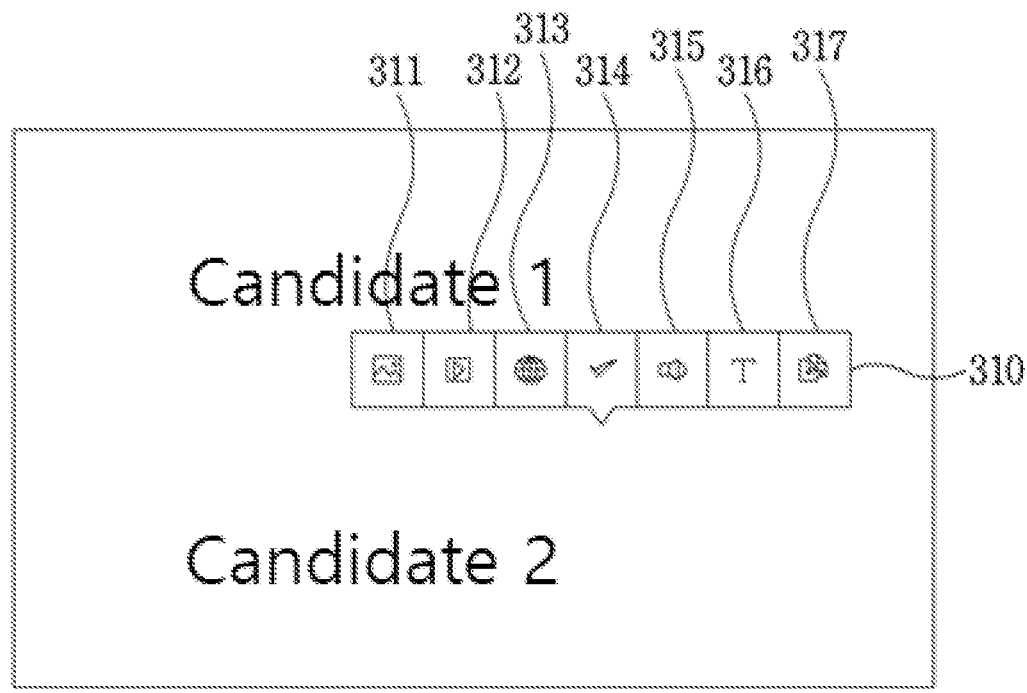

[FIG. 4]
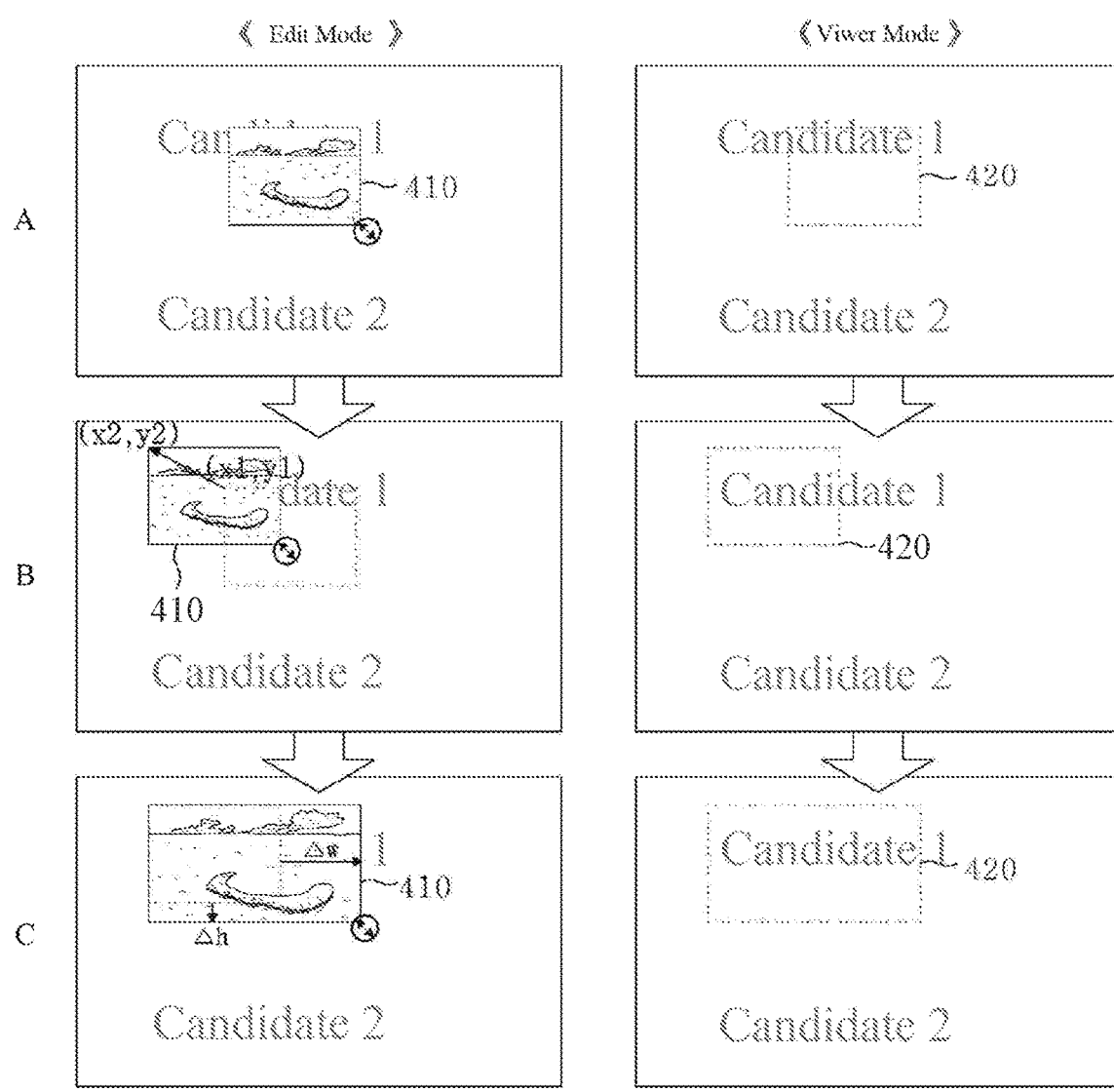

[FIG. 5]
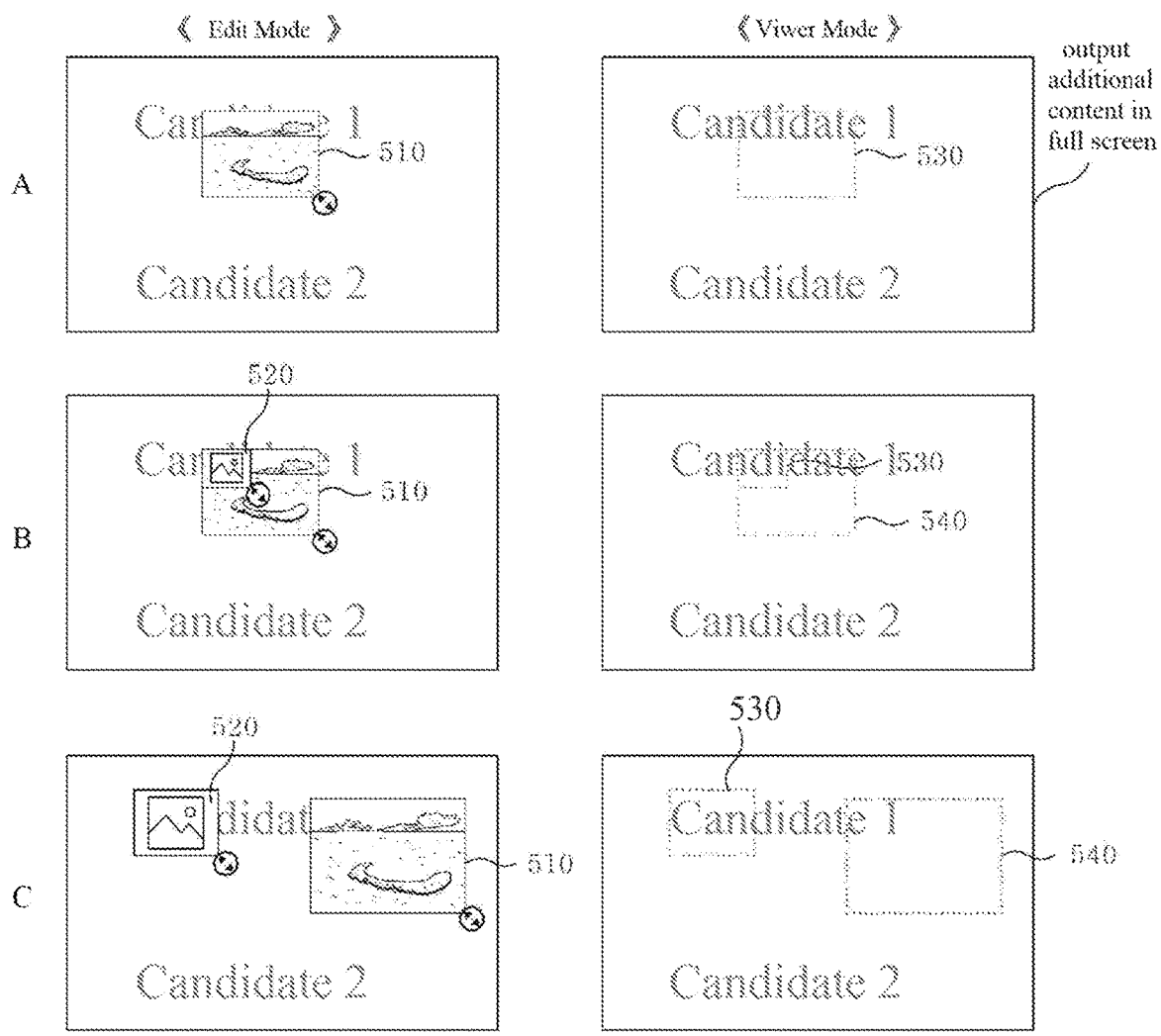

[FIG. 6]
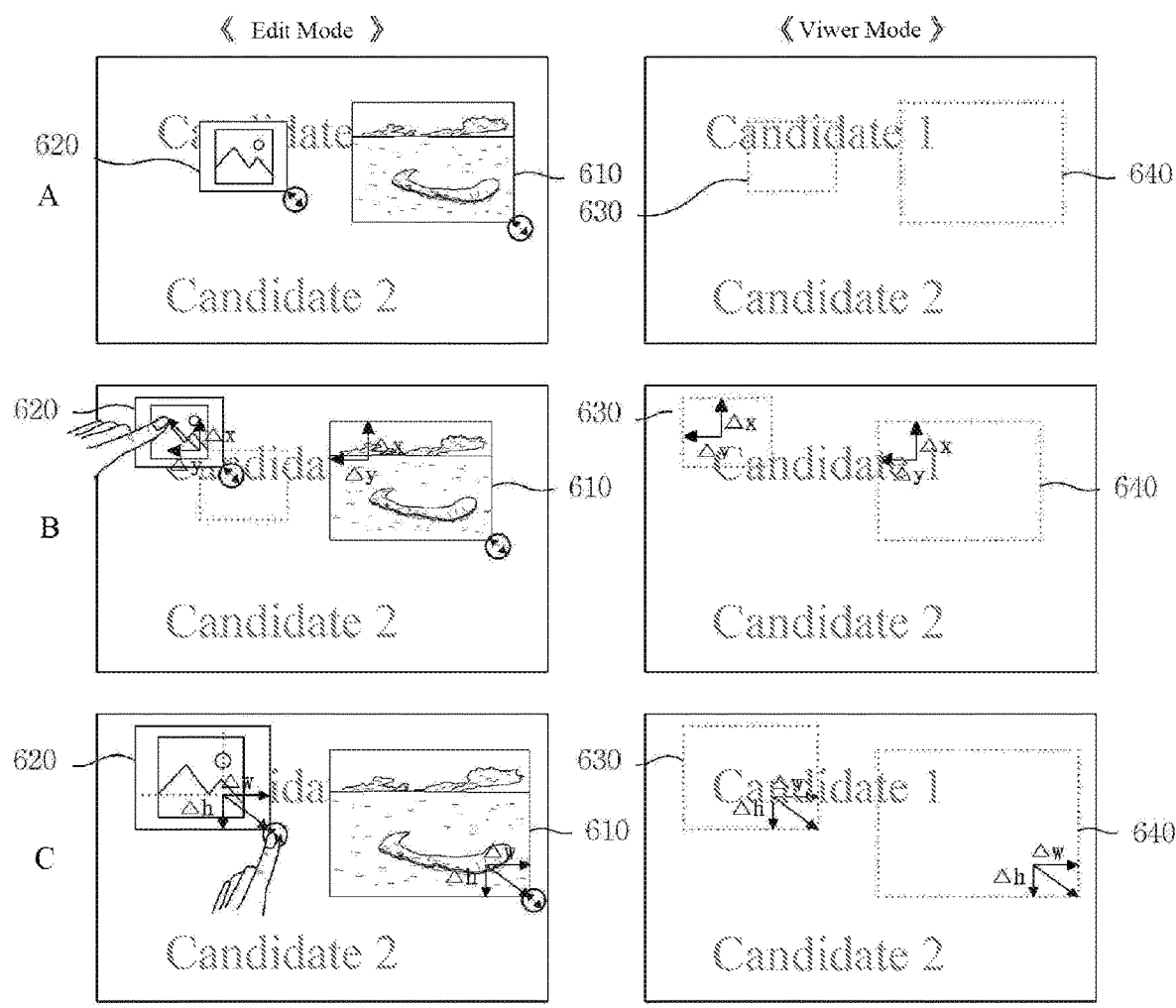

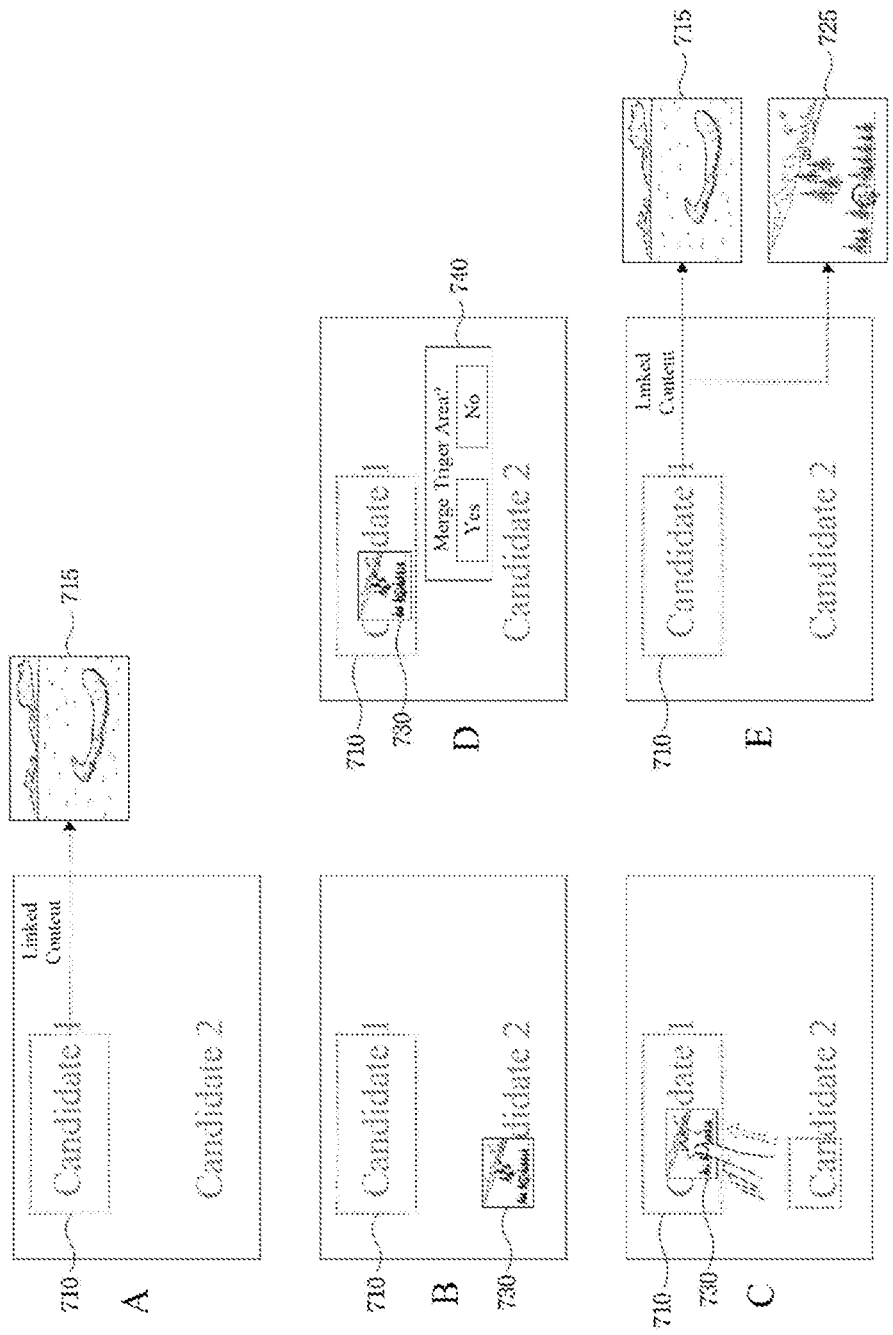
[FIG. 7]

[FIG. 8]
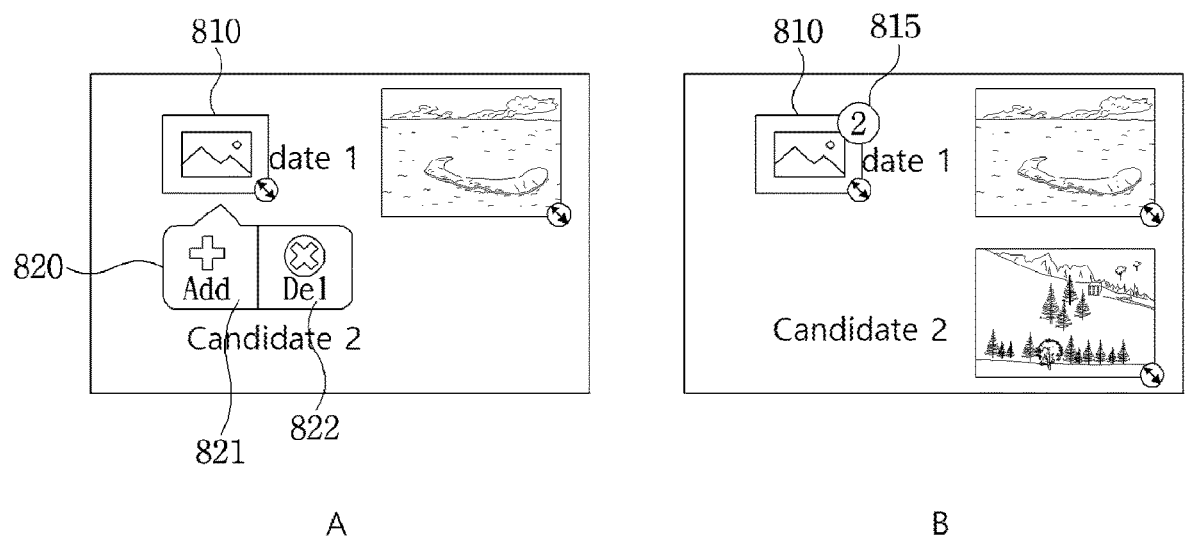

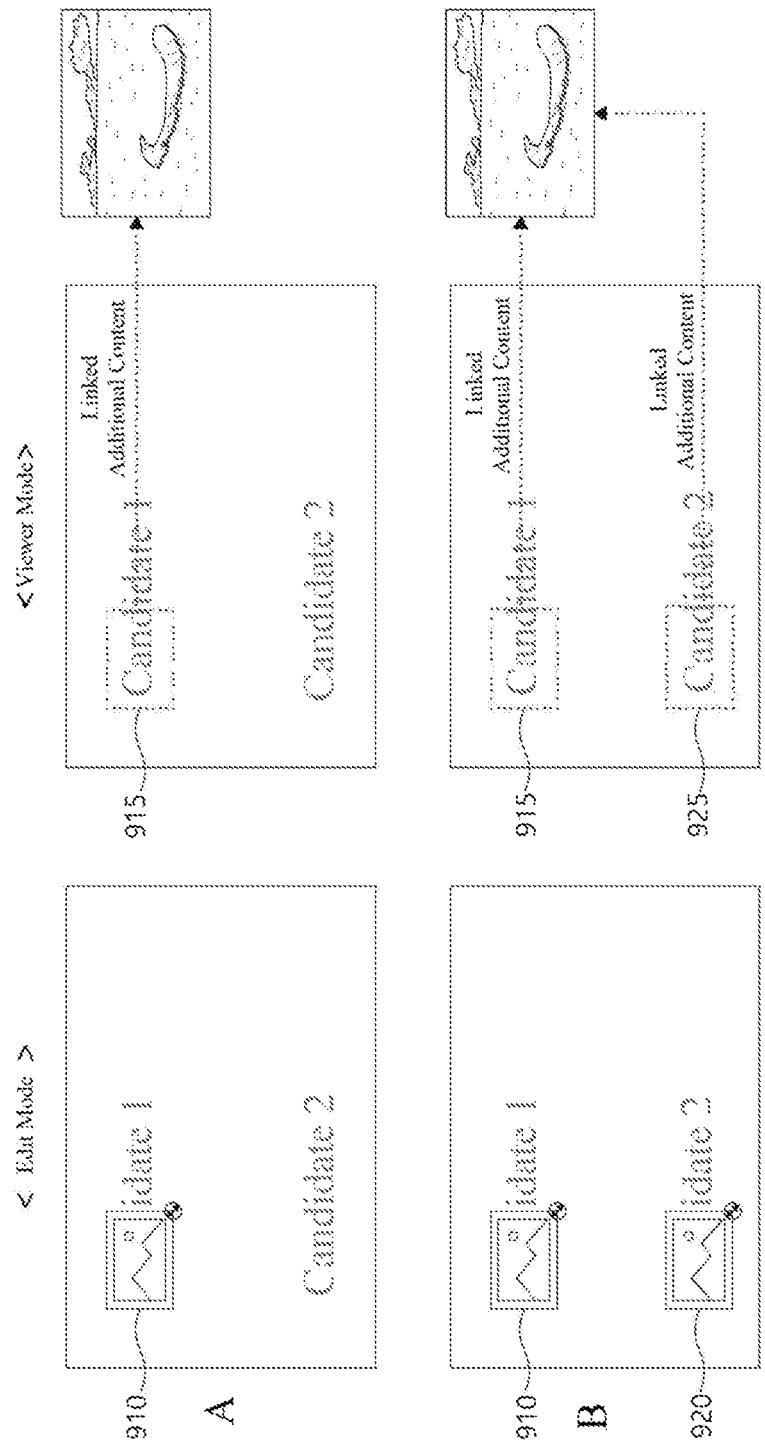
[FIG. 9]

[FIG. 10]
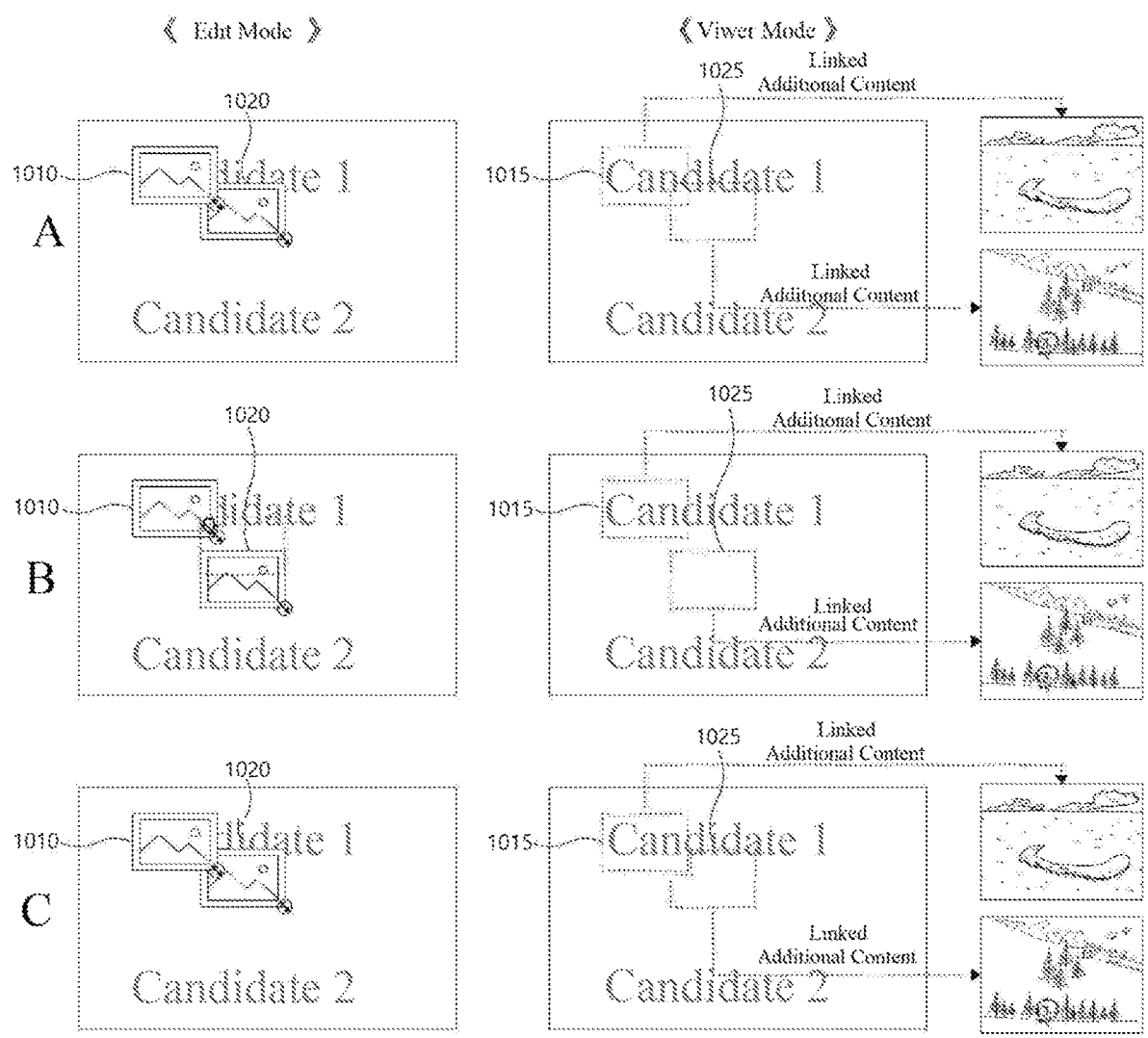

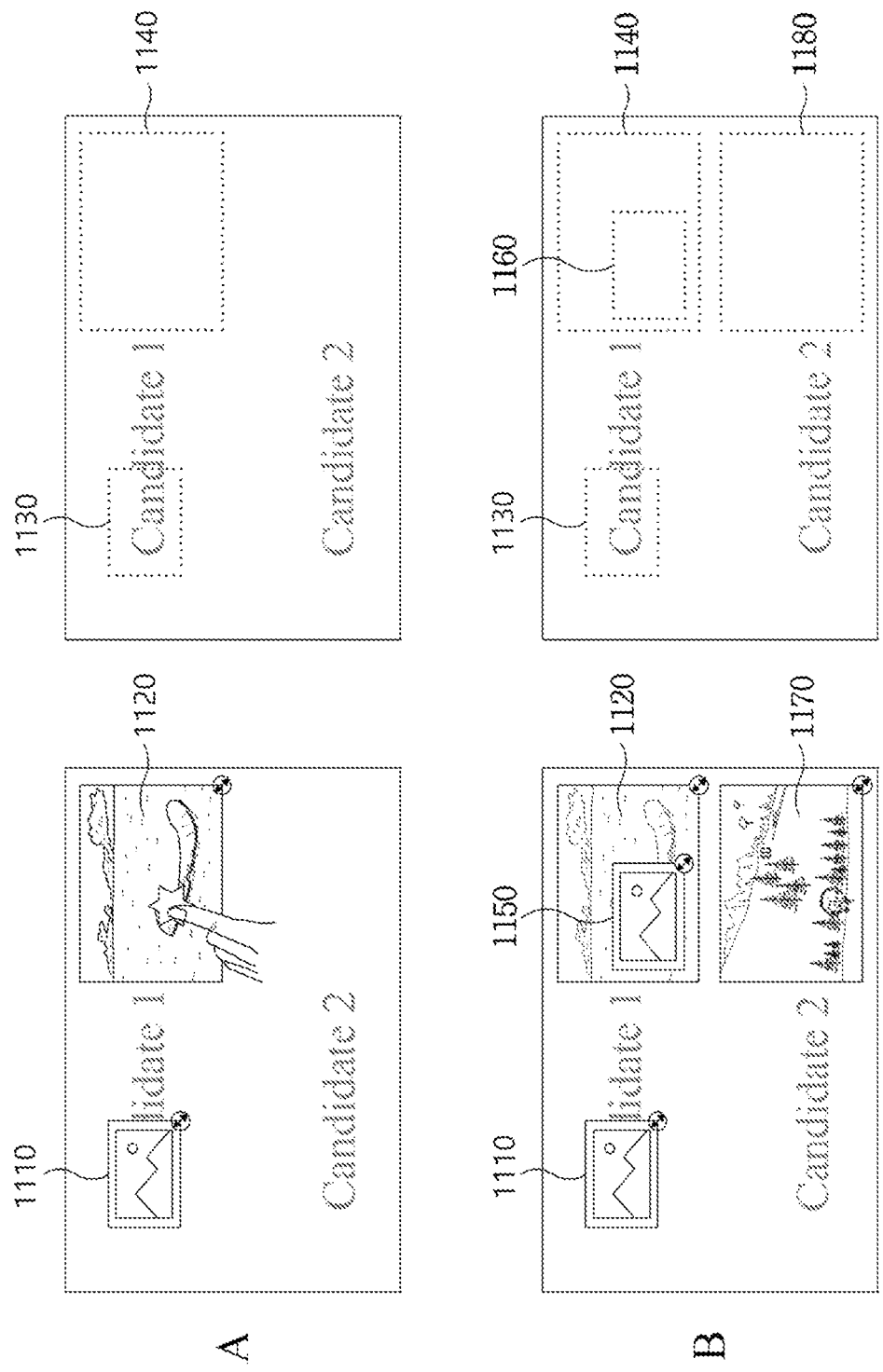

[FIG. 12]
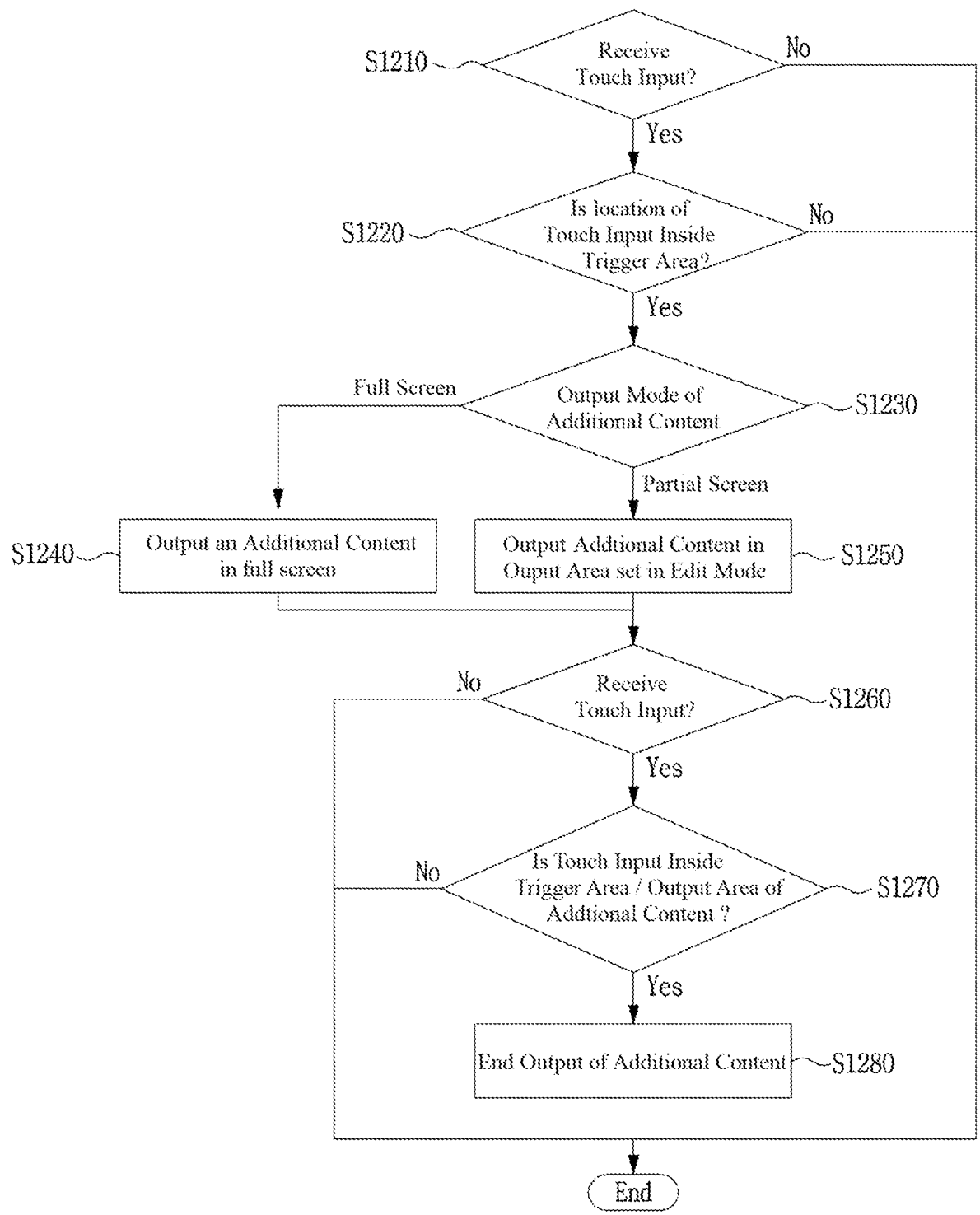

[FIG. 13]
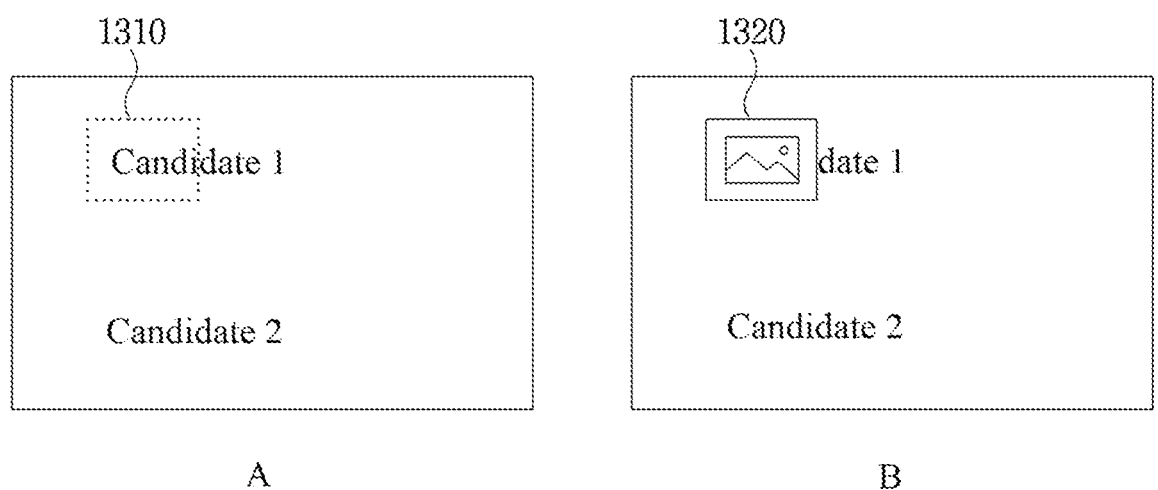

[FIG. 14]
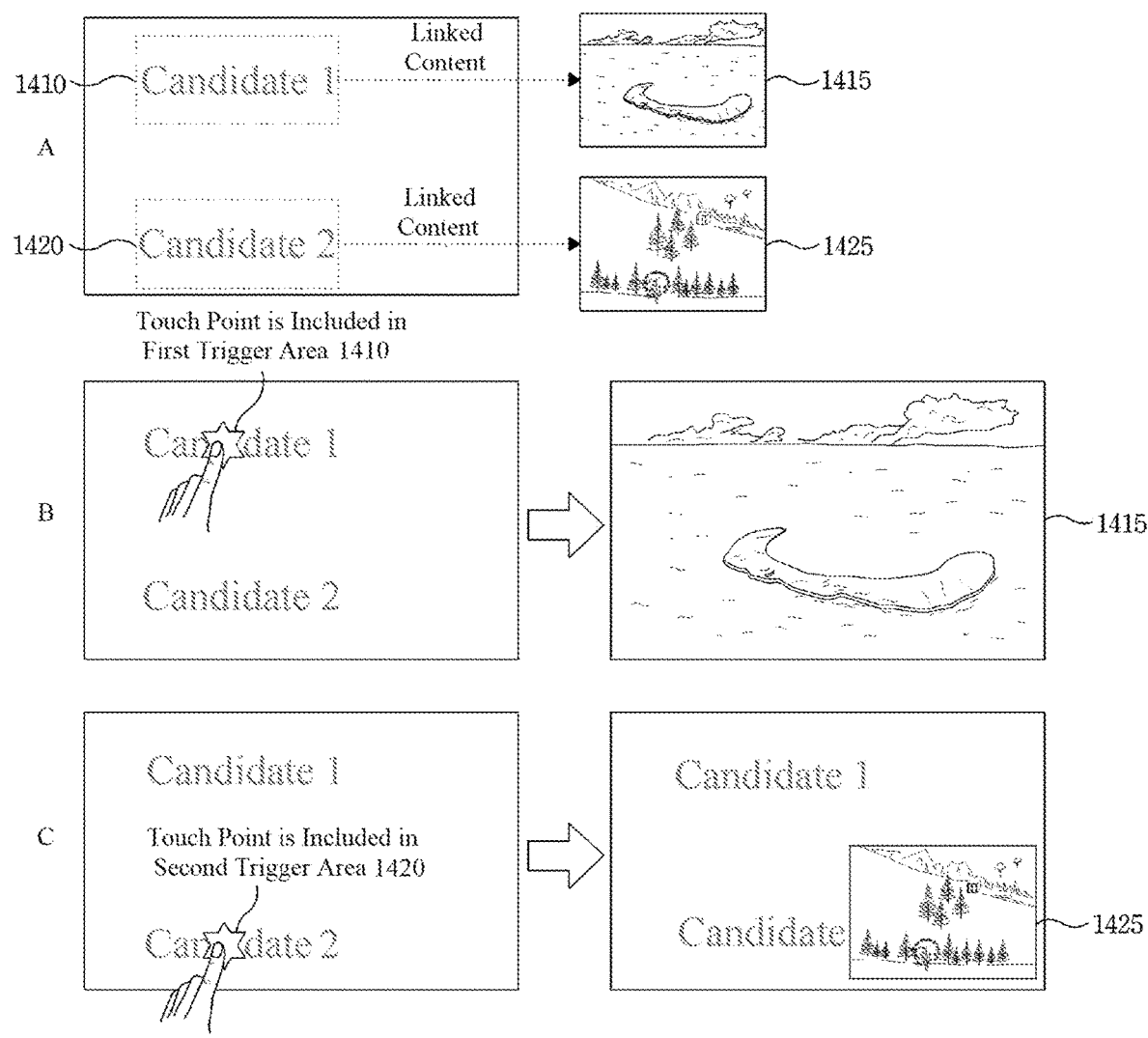

[FIG. 15]
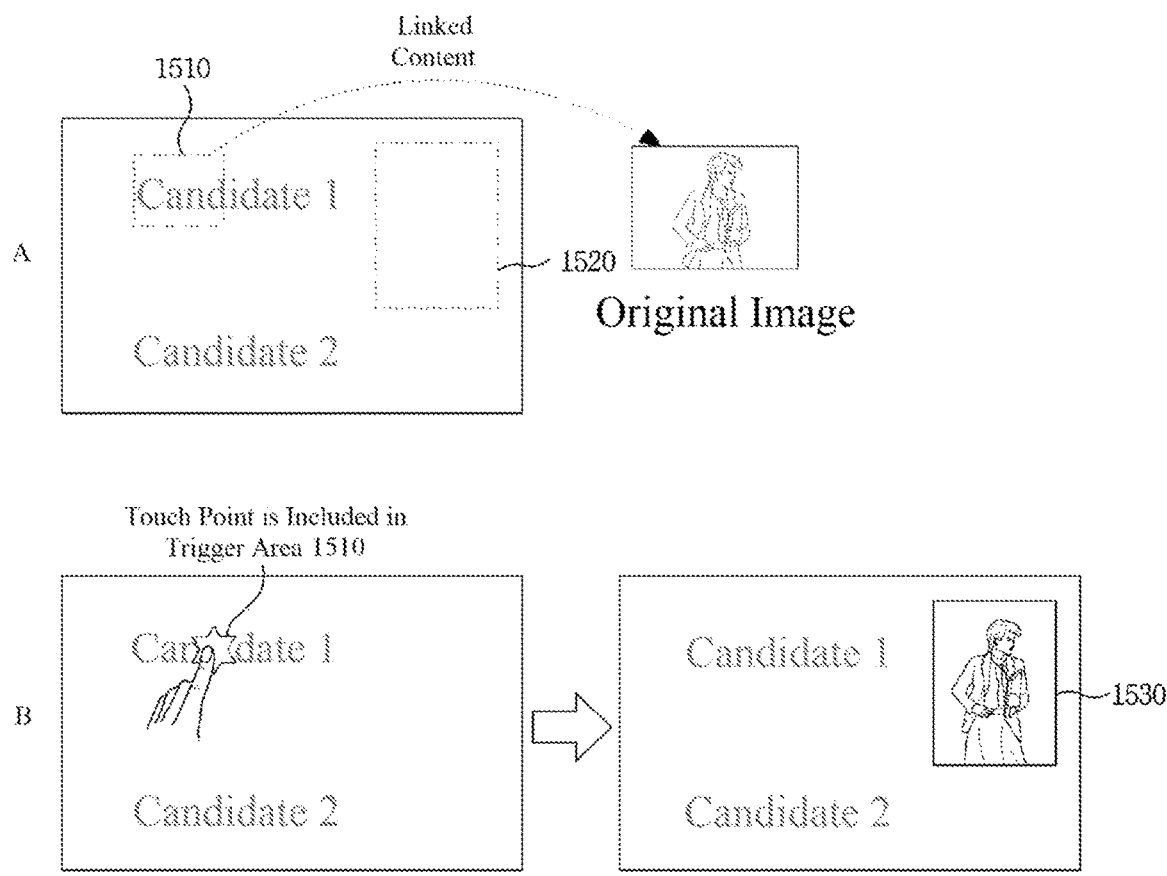

[FIG. 16]
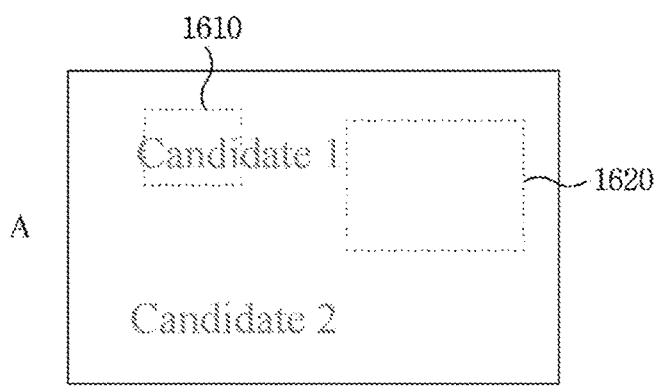
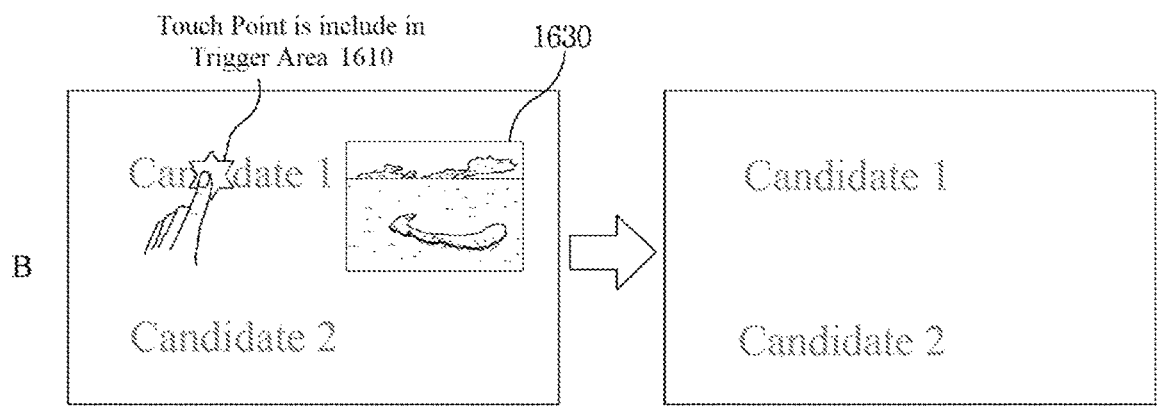

[FIG. 17]
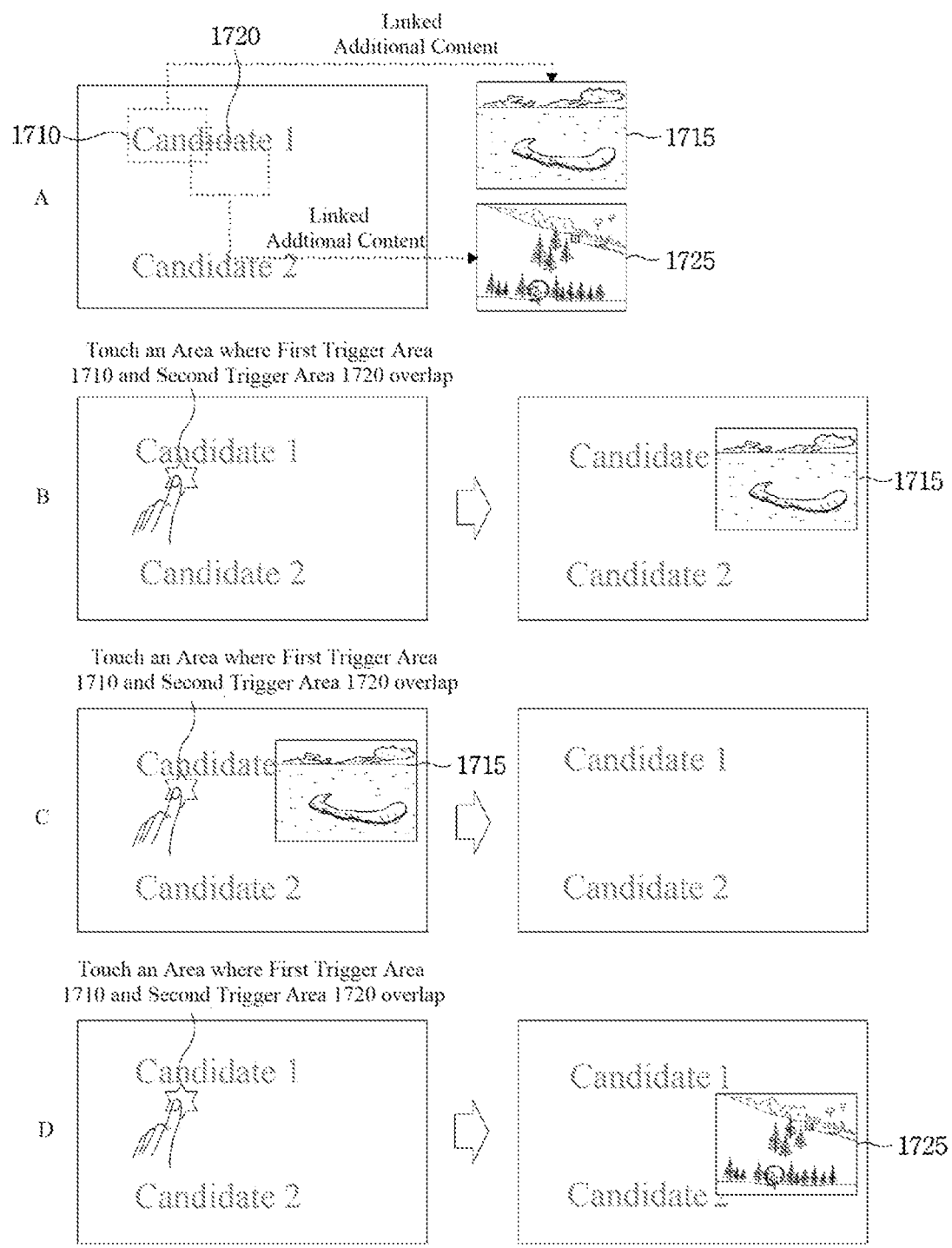

[FIG. 18]
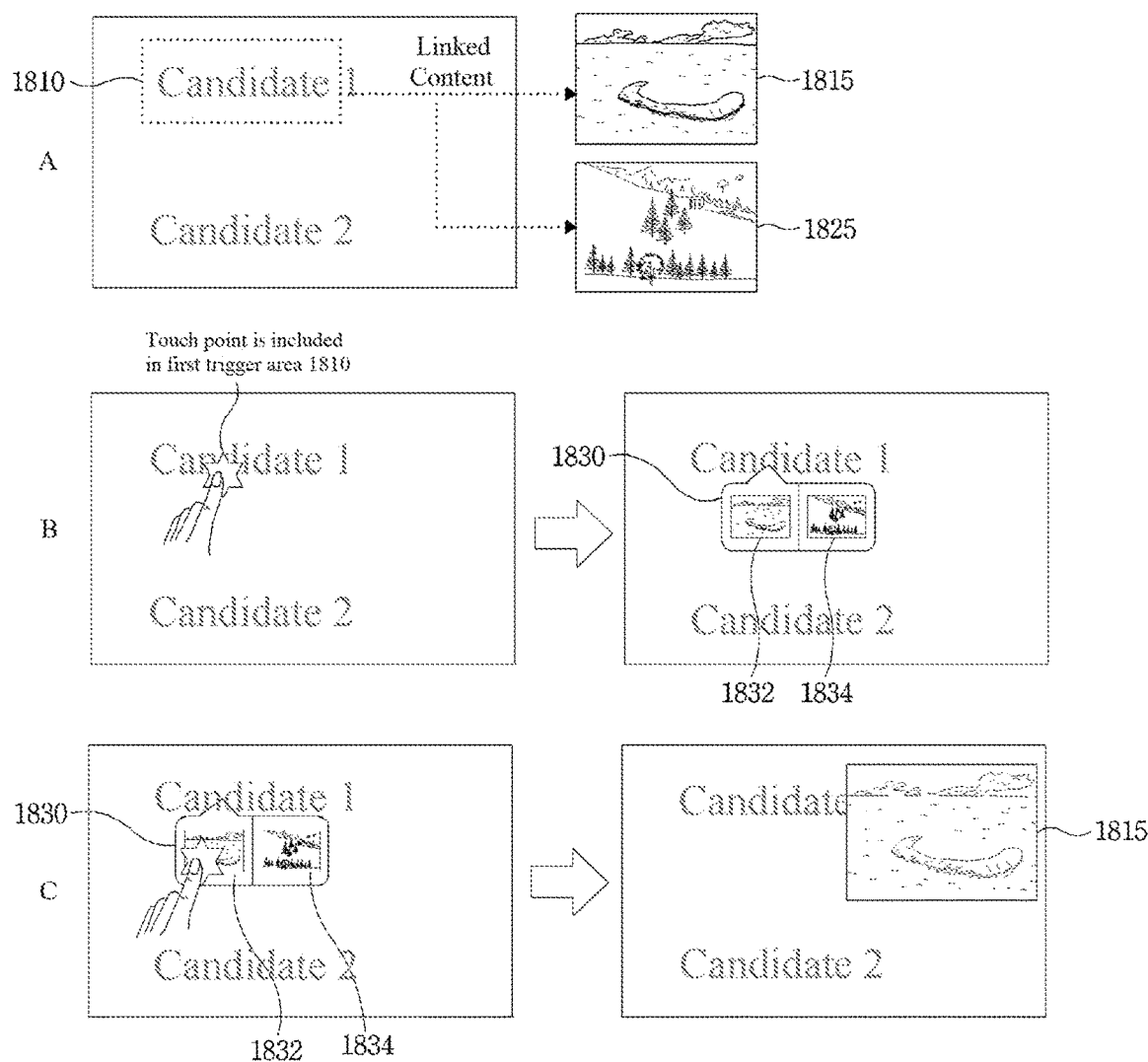

[FIG. 19]
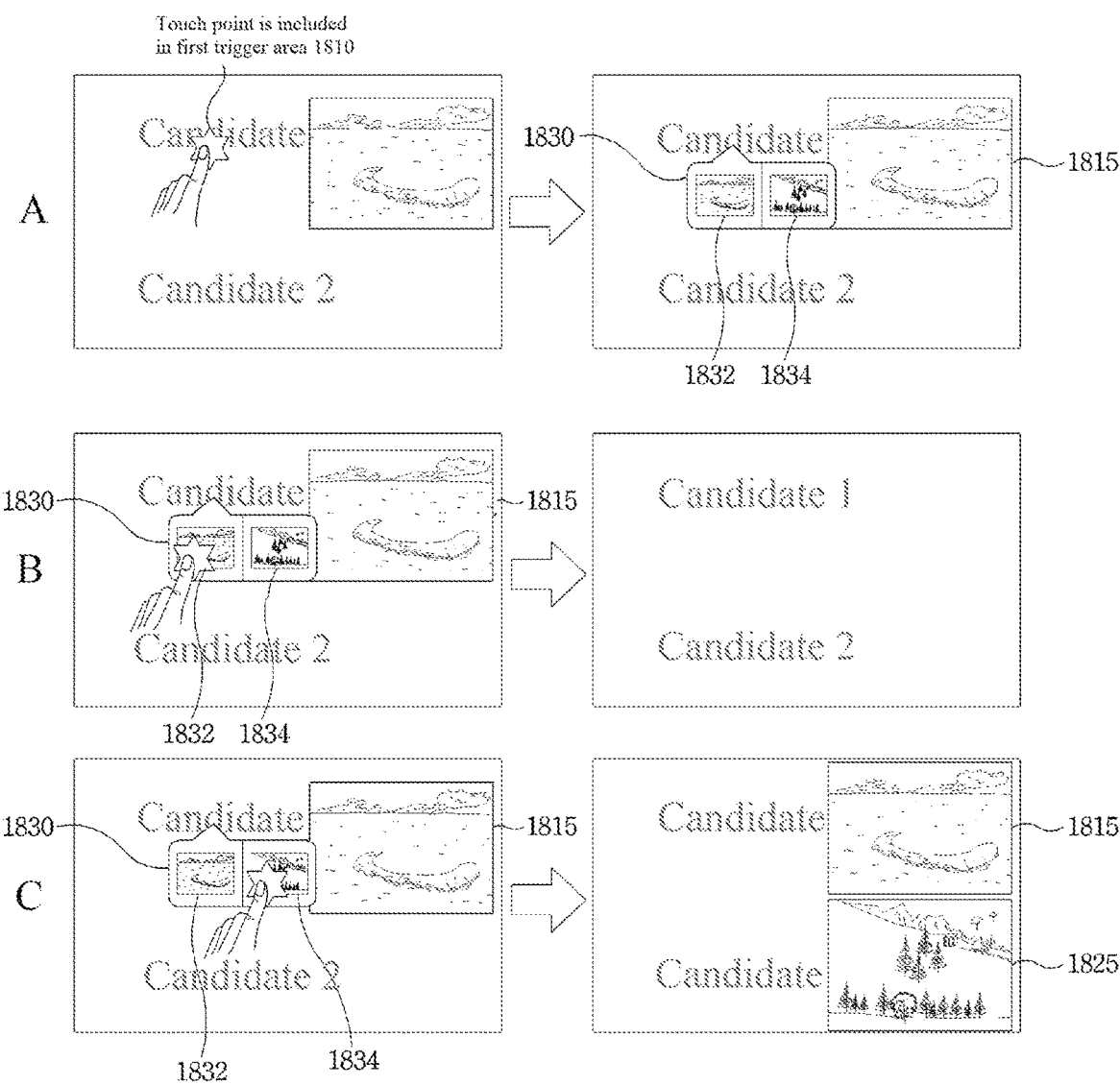

[FIG. 20]
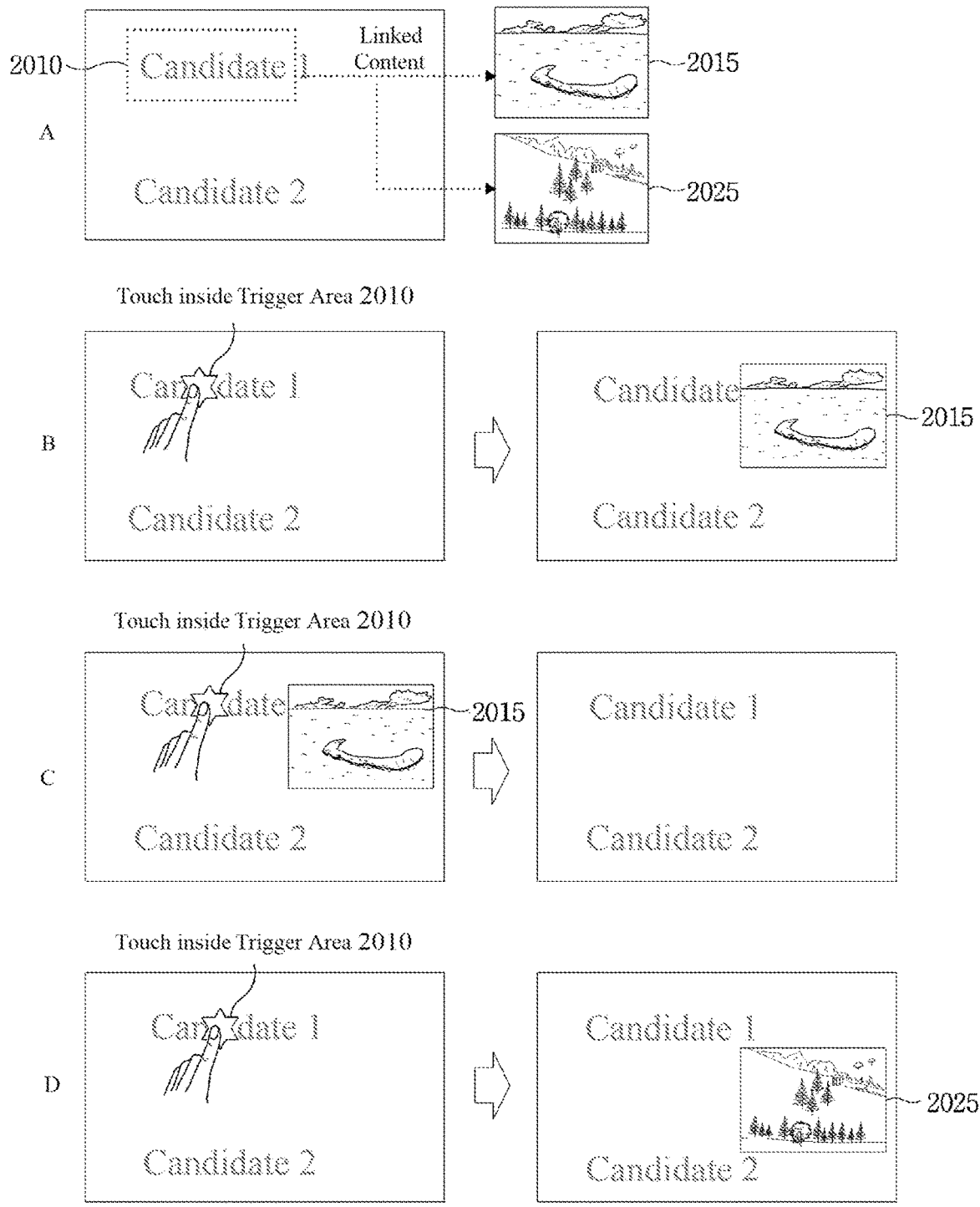

[FIG. 21]
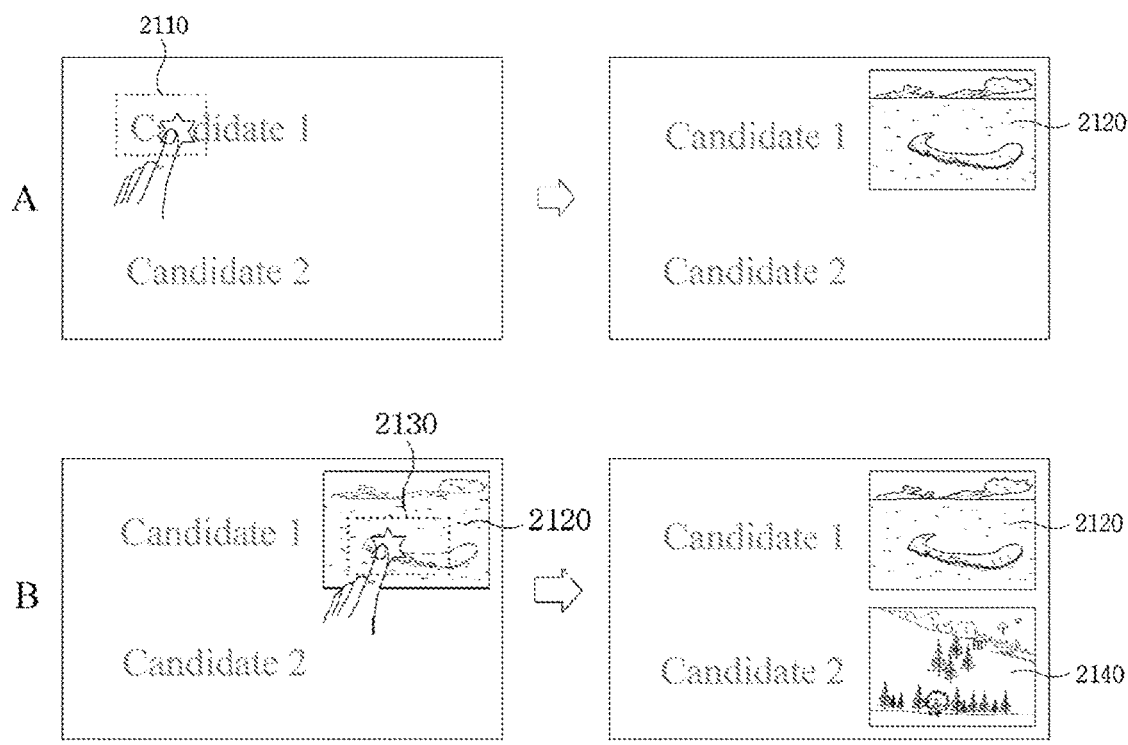

[FIG. 22]
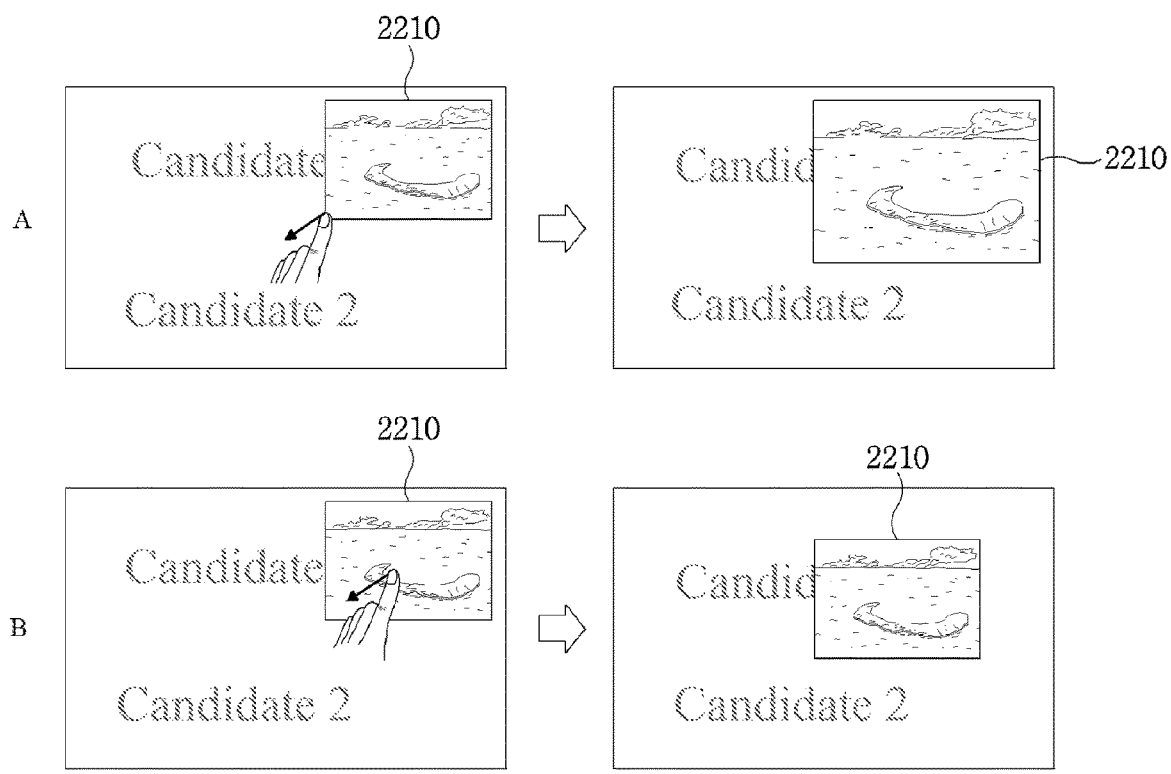

[FIG. 23]

FILE LIST 20190101.jpg
Number of Citation : 2
Citation Slide
20190101.snt
- 3page
- 5page 20190102.jpg
Number of Citation : 2
Citation Slide
20190101.snt
- 3page
20190102.snt
- 5page

TERMINAL, CONTROL METHOD THEREFOR, AND RECORDING MEDIUM IN WHICH PROGRAM FOR IMPLEMENTING METHOD IS RECORDED

TECHNICAL FIELD

The present disclosure relates a terminal capable of setting a trigger area and outputting an additional content according to a response of an input of touching the set trigger area, and a control method thereof.

BACKGROUND ART

With the advancement of technology, various electronic devices have increased beyond a PC. For example, not only mobile terminals such as mobile phones and tablet PCs, but also touch-based PCs using touch input as a main input source have appeared.

These new terminals also support document viewing and editing functions for user convenience. However, in these terminals, the word processor used in the existing PC is simply posted and used.

Accordingly, there is a need to develop a user interface capable of efficiently viewing and editing documents not only in the existing PC but also in the newly appeared terminals.

DISCLOSURE

Technical Problem

An object of the present disclosure is to provide a terminal and a control method capable of outputting an additional content in response to touching a main content.

Furthermore, the present disclosure is to provide a terminal and a control method in which a user can freely adjust an area capable of triggering an output of an additional content or an output area of an additional content.

In addition, the present disclosure is to provide a terminal and a control method capable of adaptively determining a content to be output to a main content based on a priority between a plurality of trigger areas or a priority between a plurality of additional contents.

In addition, the present disclosure is to provide a terminal and a control method that can use an additional content for controlling an output of another additional content.

The technical problems to be achieved in the present disclosure are not limited to the technical problems mentioned above, and other technical problems that are not mentioned will be clearly understood by those of ordinary skill in the art from the following description.

Technical Solution

The terminal according to the present disclosure may comprise a touch screen configured to display information and receive a touch input, and a control unit configured to output a main content on the touch screen, setting a trigger area linked to a plurality of additional contents on the main content, when an edit mode allowing the setting of the trigger area is terminated and a viewer mode is executed, in response to a touch input touching the trigger area, output a list of the plurality of the additional contents linked to the trigger area, and when any one item in the list is selected, control to output a first additional content corresponding to the selected item.

The terminal control method according to the present disclosure may comprise setting a trigger area linked to a plurality of additional contents on a main content, when an edit mode allowing a setting of the trigger area and an additional content is terminated and a viewer mode is executed, outputting a list of the plurality of the additional contents linked to the trigger area in response to a touch input touching the trigger area, and when any one item in the list is selected, outputting a first additional content corresponding to the selected item.

In the terminal and the terminal control method according to the present disclosure, in a state in which the first additional content is being output, when the item corresponding to the first additional content in the list of the additional contents is selected, the output of the first additional content may be terminated.

In the terminal and the terminal control method according to the present disclosure, in a state in which the first additional content is being output, when an item corresponding to a second additional content different from the first additional content in the list of the additional contents is selected, as the output of the first additional content is terminated, an output of the second additional content may be started.

In the terminal and the terminal control method according to the present disclosure, the first additional content may be output through an output area of the first additional content set in the edit mode.

In the terminal and the terminal control method according to the present disclosure, when a user input for touching and dragging the first additional content is received, in response to the user input, at least one of a location or a size of the first additional content may be changed.

In the terminal and the terminal control method according to the present disclosure, even if the location or the size of the first additional content is changed, a location or a size of the output area may be not changed.

In the terminal and the terminal control method according to the present disclosure, the control unit may generate log data recording a usage history of each of the plurality of the additional contents.

In the terminal and the terminal control method according to the present disclosure, the usage history may include at least one of a number of times the additional content is cited, a file name in which the additional content is cited, or a page number in which the additional content is cited.

Features briefly summarized above with respect to the present disclosure are only exemplary aspects of the detailed description of the present disclosure described below, and do not limit the scope of the present disclosure.

Advantageous Effects

The present disclosure has an effect of providing a terminal and a control method capable of outputting an additional content in response to touching a main content.

Furthermore, the present disclosure has an effect of providing a terminal and a control method in which a user can freely adjust an area that can trigger an output of an additional content or an output area of an additional content.

In addition, the present disclosure may provide a terminal and a control method capable of adaptively determining a content to be output to a main content based on a priority between a plurality of trigger areas or a priority between a plurality of additional contents.

In addition, the present disclosure may provide a terminal and a control method that can use an additional content for controlling an output of another additional content.

The effect obtainable in the present disclosure is not limited to the above-mentioned effects, and other effects not mentioned are clearly understood by those of ordinary skill in the art from the following description.

DESCRIPTION OF DRAWINGS

FIG. 1 is a block diagram of a terminal according to the present disclosure.

FIG. 2 is a flow chart showing an operation of a terminal in an edit mode.

FIG. 3 is a diagram for explaining an example of selecting an additional content.

FIG. 4 is a diagram illustrating an example of setting a trigger area based on a graphic object.

FIG. 5 is a diagram illustrating an example of setting a trigger area and an output area of an additional content.

FIG. 6 is a diagram illustrating an example of setting a trigger area and an output area of an additional content.

FIG. 7 is a diagram illustrating an example in which a plurality of additional contents is linked to one trigger area.

FIG. 8 is a diagram illustrating an example in which a plurality of additional contents is linked to a trigger object using a sub-menu.

FIG. 9 is a diagram illustrating an example of setting a plurality of trigger areas for one additional content.

FIG. 10 is a diagram illustrating an operation of a terminal when a plurality of trigger areas is overlapped and arranged.

FIG. 11 shows an example in which an additional content previously inserted in a main content is set as a trigger area for a new additional content.

FIG. 12 is a flow chart showing an operation of a terminal in a viewer mode.

FIG. 13 is a diagram illustrating an example in which a trigger area is visually identified and displayed.

FIG. 14 is a diagram illustrating an example in which an additional content is output in response to a user input touching a trigger area.

FIG. 15 is a diagram illustrating an example in which an additional content is rotated and output.

FIG. 16 is a diagram illustrating an example in which an output of an additional content is terminated.

FIG. 17 is a diagram illustrating an operation of a terminal when a user input touching an area in which a plurality of trigger areas is overlapped is received.

FIGS. 18 and 19 are diagrams illustrating an example in which a list of additional contents is output in response to a user input touching a trigger area.

FIG. 20 is a diagram illustrating an operation of a terminal when a user input touching a trigger area to which a plurality of additional contents is linked is received.

FIG. 21 shows an example in which another additional content is output in response to a user input touching an additional content.

FIG. 22 is a diagram illustrating an example in which an output location and a size of an additional content are changed.

FIG. 23 is a diagram illustrating an example in which a usage history of each content is output.

MODE FOR INVENTION

Hereinafter, embodiments of the present disclosure will be described in detail with reference to the accompanying drawings so that those of ordinary skill in the art may easily implement the embodiments. However, the present disclosure may be implemented in various different forms and is not limited to the embodiments described herein.

In describing an embodiment of the present disclosure, if it is determined that a detailed description of a known configuration or function may obscure the subject matter of the present disclosure, the detailed description thereof will be omitted. Further, in the drawings, portions not related to the description of the present disclosure are omitted, and similar reference numerals are attached to similar portions.

In the present disclosure, when a certain component is said to be "connected", "coupled" or "connected" with another component, it may include not only a direct connection, but also an indirect connection in which another component exists in the middle. In addition, when a component "includes" or "has" other components, it means that other components may be further included, rather than excluding other components unless specifically stated to the contrary.

In the present disclosure, terms such as first and second are used only for the purpose of distinguishing one component from other components, and do not limit the order or importance of the components unless otherwise noted. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each characteristic, and do not necessarily mean that the components are separated. That is, a plurality of components may be integrated into one hardware or software unit, or one component may be distributed to form a plurality of hardware or software units. Therefore, even if not stated otherwise, such integrated or distributed embodiments are also included in the scope of the present disclosure.

In the present disclosure, components described in various embodiments do not necessarily mean essential components, and some may be optional components. Accordingly, an embodiment comprising a subset of components described in an embodiment is also included in the scope of the present disclosure. In addition, embodiments including other components in addition to the components described in the various embodiments are included in the scope of the present disclosure.

The present disclosure relates to an application including a content editing tool and a terminal capable of operating the application. A content editing tool described in the present disclosure provides a function of setting a trigger area in a main content and linking the trigger area with an additional content. When a user input of selecting a trigger area is received after editing of a main content is completed, an additional content linked to the trigger area may be output. Hereinafter, a content editing tool and a terminal capable of operating an application supporting the content editing tool according to the present disclosure will be described in detail.

FIG. 1 is a block diagram of a terminal according to the present disclosure. A terminal described in the present disclosure may be a mobile terminal such as a smartphone, a tablet PC (Personal Computer), a laptop (Laptop), or a PDA (Personal Digital Assistants), or a fixed terminal such as a personal computer (PC) or a smart TV. However, for convenience of explanation, it is assumed that a terminal is a mobile terminal in the drawings and embodiments to be described later.

Referring to FIG. 1, a terminal according to the present disclosure includes a communication unit 110, a camera 120, a microphone 130, a user input unit 140, a display unit 150, a sound output unit 160, a memory 170 and a control unit 180.

A communication unit 110 allows the terminal to communicate with other terminals. A communication unit 110 may perform communication through a wireless method or a wired method. For example, in order to perform communication in a wireless manner, a communication unit 110 may include at least one of a mobile communication module or a wireless Internet module. A mobile communication module is for performing communication through a mobile communication base station such as LTE, HSDPA, or CDMA, and a wireless Internet module is for performing communication through a wireless LAN (Wi-Fi). A wired method may include LAN, USB, HDMI, RGB or DVI.

A camera 120 receives an image signal and performs signal processing on the received image signal. A microphone 130 receives an audio signal and performs signal processing on the received audio signal.

A user input unit 140 receives a user input. A user input unit 140 may include at least one of an input unit in the form of a button exposed to an outside of a terminal or a touch input unit capable of receiving a touch input touching a display unit 150. A touch input unit may include at least one touch sensor. In this case, when a display unit 150 and a touch input unit form a mutual layer structure, such a structure may be referred to as a "touch screen". In such a touch screen structure, various types of touch inputs can be received, such as selecting or dragging an object displayed on a touch screen using a pointer.

A user input unit 140 may include at least one motion sensor for receiving a gesture input. In this case, the motion sensor may include a gyro sensor or an acceleration sensor capable of detecting a movement of a terminal. As another example, a control unit 180 may analyze a user's movement through an image input through a camera 120 and determine whether a gesture input has been received based on the analysis result.

In embodiments to be described later, an example in which a terminal operates based on various user inputs through a touch screen will be described. However, in embodiments to be described later, implementing a function executed by a touch input by an input of touching (or pushing) a button exposed outside a terminal or a gesture input is also included in the embodiment of the present disclosure.

A display unit 150 outputs information processed by a terminal. For example, a display unit 150 plays a role of outputting an execution screen of an application operated by a terminal, and a user interface, a graphic user interface, or the like on the execution screen.

A sound output unit 160 serves to output audio data received from a communication unit 110 or stored in a memory 170.

A memory 170 stores data for execution of an application and data processed by a terminal. A memory 170 includes at least one storage medium of a hard disk, a solid state disk (SSD), a flash memory, a card-type storage device (for example, a SD or XD memory), a random access memory (RAM) or a read only memory (ROM). Web storage that can be accessed remotely through a communication unit 110 may also be included in a category of a memory 170.

A control unit 180 controls overall operations of a terminal. A control unit 180 may process signals, data, or information input or output through components constituting a terminal. In addition, a control unit 180 may execute an application stored in a memory 170. A control unit 180 may include an operation/control device such as a central processing unit (CPU), a graphic processing unit (GPU), a micro controller unit (MCU), or a micro processing unit (MPU).

A terminal does not have to include all the components shown in FIG. 1, and some of the components shown in FIG. 1 may not be included depending on the implementation form. The present disclosure will be described in detail based on the above description.

A main content described in the present disclosure may be a text-based content or a multimedia content such as an image or a video. For example, a main content may be a text-based content based on a presentation document (e.g., a file with an extension of ppt(x)), a spreadsheet document (e.g., a file with an extension of xls(x)), a word processing document (e.g., a file with an extension of doc(x), hwp, txt, or pdf), a webpage (e.g., a file with an extension of html), or an e-book (e.g., a file with an extension such as epub), or a multimedia content based on an image (e.g., a file having an extension such as jpg, gif, tif, or bmp) or a video (e.g., a file having an extension such as mpeg, avi, mp4, wmv, or mov).

Hereinafter, it is assumed a state in which a trigger area can be set in a main content is defined as an edit mode, and a state in which an additional content linked to a trigger area is output in response to touching a trigger area is defined as a viewer mode. That is, the edit mode may refer to a state in which settings related to a trigger area and an additional content can be changed, and the viewer mode may refer to a state in which settings related to a trigger area and an additional content cannot be changed. A viewer mode may also be referred to as a presentation mode or a slide show mode.

FIG. 2 is a flow chart showing an operation of a terminal in an edit mode.

When a main content is selected, a control unit 180 may output the selected main content on a display unit 150 (S210). A control unit 180 may output a main content in a full screen while maintaining an aspect ratio of the main content. Accordingly, when an aspect ratio of a main content is different from an aspect ratio of a display unit 150, a blank space may be generated in the display unit 150. A control unit 180 may fill a blank space with a single predefined color or a color selected by a user selection. Alternatively, a control unit 180 may determine a pixel value of a pixel included in a margin based on a pixel value at a boundary of a main content. For example, a pixel value of a pixel included in a margin may be set to be the same as a sample value of a sample located at a boundary of a main content having the same x-coordinate or y-coordinate as the pixel.

When a main content includes a plurality of pages, a control unit 180 may control to output at least one or more pages through a display unit 150.

Next, a control unit 180 may select an additional content to be inserted into a main content based on a user input (S220). An additional content that can be inserted into a main content may be a text-based content or a content such as an image, a video, or a music. That is, a main content and an additional content may have the same type or different types.

FIG. 3 is a diagram for explaining an example of selecting an additional content.

When a predetermined user input is received while a main content is being output, a control unit 180 may output a menu 310 for selecting an additional content. Herein, the predetermined touch input may be a touch input touching an arbitrary location of a main content, a predefined type of touch input, or a touch input touching a menu calling a content selection function. The predefined type may be that at least one of the number of pointers, a touch strength (touch pressure), a touch time, or the number of touches is greater than or equal to a reference value.

As an example, when a user input touching an arbitrary location of a main content is received, as in the example shown in FIG. 3, a control unit 180 may output a menu 310 for selecting an additional content at a point of user's touch input. The selection of the additional content may be performed in a following order: i) selecting a content type, and ii) outputting a list of contents of the selected content type or generating the selected content type.

As an example, each item included in a menu 310 shown in FIG. 3 may be for selecting a content type. Specifically, each item of a menu 310 shown in FIG. 3 may be for selecting an image 311, a video 312, a web 313, a mark 314, a music 315, a text 316, and a specific page 317 in a slide file.

When a user input for selecting a content type is received, a control unit 180 may output a list of contents corresponding to the selected content type or execute an application/an input window for generating a content corresponding to the selected content type. In this case, whether to output a content list or to execute an application for generating a content may be determined by a user input. or any one of them may be executed by default. Alternatively, any one of them may be executed by default.

For example, when an image item 311 or a video item 312 is selected through a menu 310, a control unit 180 may output a list of image or video files stored in a memory 170 or a cloud, or execute a camera application to generate an image or video file. When any one of the file list is selected or taking an image or a video through a camera 120 is completed, the selected/generated image or video may be determined as an additional content to be inserted into a main content.

Alternatively, when a web item 313 is selected through a menu 310, a control unit 180 may output a list of web pages stored in a memory 170 or a cloud, a list of favorites, or a list of frequently visited web pages, or may execute a web browser application for selecting a web page. Alternatively, an input window for inputting an IP address or a URL (Uniform Resource Locator) address of a web page may be output. An IP address or a URL address of a web page may be input through an input window. According to the above process, when a web site document or an Internet Protocol (IP) address or a uniform resource locator (URL) address of a web site is determined, a corresponding web site may be determined as an additional content to be inserted into a main content.

Alternatively, when a mark item 314 is selected through the menu 310, a control unit 180 may output a list of pre-stored images that can be inserted into a main content. The pre-stored images may include at least one of an icon, an emoji, or a figure.

Alternatively, when an audio item 315 is selected through the menu 310, a control unit 180 may output a list of music files stored in a memory 170 or in a cloud, or may execute a recording application to generate an audio file. When any one of a file list is selected or recording is completed through a microphone 130, the selected/generated data may be determined as an additional content to be inserted into a main content.

Alternatively, when a text item 316 is selected through the menu 310, a control unit 180 may output an input window for inputting text. A control unit 180 may determine a text input through the input window as an additional content to be inserted into a main content.

Alternatively, when a slide item 317 is selected through the menu 310, a control unit 180 may output an input window for inputting a list of pages or a page number in a slide file. When any one of a page list is selected or a page number is input through the input window, a corresponding page may be determined as an additional content.

Although not shown, a document different from a document being edited may be set as an additional content. For example, when a document item is selected, a control unit 180 may output a list of document files stored in a memory 170 or in a cloud, or may execute a document creation application to generate a document file. When any one of a file list is selected or a document is generated through a document creation application, the selected/generated document may be determined as an additional content to be inserted into a main content.

In the above-described example, after selecting a content type, it is illustrated that an application for generating a content list of a selected content type or a selected content type is executed, but this is only an embodiment for selecting an additional content, and it does not limit the present disclosure. For example, without selecting a content type, a content list may be output or an application for generating a content may be executed, or when a content type is selected, a content corresponding to a predefined condition may be determined as an additional content. Herein, the content corresponding to the predefined condition may include the most recently viewed content, the most recently modified content, the most recently stored content in a terminal, a content with the highest number of views by users for a predetermined period, a content previously specified by a user, and the like.

In addition, in FIG. 3, it is illustrated that a content type is determined based on a user input touching any one of items included in a menu 310, but it is also possible for a content type to be selected in a way different from that shown. For example, a content type may be determined according to a type of user's touch input. For example, when a first type of touch input is received, it may be determined that a first type of content is selected, whereas when a second type of touch input is received, it may be determined that the second type of content is selected. Herein, the first type and the second type of touch input may be different in at least one of the number of pointers, a touch strength (touch pressure), a touch time, and the number of touches.

When an additional content is selected, a trigger area linked to the additional content in a main content may be set (S230). Specifically, when an additional content is selected, a control unit 180 may output a graphic object for setting a trigger area in a main content, and adjust a location and size of the trigger area according to a location and size of the graphic object. For convenience of explanation, a graphic object for setting a trigger area will be defined as a trigger object.

FIG. 4 is a diagram illustrating an example of setting a trigger area based on a trigger object.

The left drawing of FIG. 4 shows an example of setting a trigger area on a main content in an edit mode, and the right drawing of FIG. 4 shows an example of identifying and displaying a trigger area in a viewer mode. In addition, the dotted outline of the left drawing of FIG. 4 indicates a location or size of a previous graphic object, and the dotted outline of the right drawing of FIG. 4 indicates a trigger area.

When an additional content is determined, a control unit 180 may control a trigger object 410 for setting a trigger area 420 to be output, as in the example shown in FIG. 4A. The trigger object 410 may be an image representing an additional content. Herein, the image representing the additional content includes at least one of a thumbnail or a preview image. For example, if an image is selected as an additional content, a thumbnail of the image selected for setting a trigger area may be output as a trigger object 410.

In addition to the described example, a trigger object 410 may be an image corresponding to a type of an additional content. For example, when an additional content is determined, an image corresponding to a type of the determined additional content may be output as a trigger object 410.

Alternatively, a predefined/pre-stored image or polygonal image may be output as a trigger object 410.

A control unit 180 may set a location and/or size of a trigger area 420 according to a location and/or size of a trigger object 410. That is, the location and size of the trigger object 410 may correspond to the location and size of the trigger area 420.

As an example, as in the example shown in FIG. 4B, when a location of a trigger object 410 is changed, a location of a trigger area 420 according to the changed location of the trigger object 410 may be changed. As an example, in FIG. 4B, if a top left coordinate of a trigger object 410 is changed from (x1, y1) to (x2, y2), a coordinate of the trigger area 420 may also be changed from (x1, y1) to (x2, y2).

In addition, as in the example shown in FIG. 4C, when a size of a trigger object 410 is changed, a size of a trigger area 420 may also be changed according to the changed size of the trigger object 410. For example, in FIG. 4C, if a width and a height of a trigger object 410 are increased by Δw and Δh, respectively, a size of a trigger area 420 may also increase by Δw and Δh.

According to an output mode of an additional content, a step of setting an output area of the additional content may be selectively performed (S240, S250). Herein, the output mode may indicate whether to output the additional content in a full screen or to output the additional content in a partial screen when a user input touching a trigger area is received under a viewer mode.

When an additional content is set to be output in a partial screen, a graphic object for setting a trigger area and a trigger object for setting an output area of the additional content may be simultaneously output. For convenience of description, a graphic object for setting an output area of additional content will be defined as a content object.

The output mode of an additional content may be determined according to a user input, or either a full screen or a partial screen may be applied by default as the output mode of the additional content. For example, when an additional content is selected, a control unit 180 may output a menu for determining an output mode of the additional content, and select the output mode of the additional content based on a user input to the menu.

Alternatively, outputting an additional content in a full screen or a partial screen may be set as a default.

Alternatively, a control unit 180 may determine whether to set a selected additional content to be output in a full screen or a partial screen, depending on whether a previous additional content is set to be displayed in a full screen or a partial screen.

A control unit 180 may change an output mode of an additional content based on a user input. Specifically, when a predetermined user input is received while an additional content is set to be output in a full screen, a control unit 180 may change the additional content to be output in a partial screen. For example, when a predetermined type of touch input is received for a trigger object, a control unit 180 may change an output mode of an additional content from a full screen to a partial screen. Herein, the predetermined type of touch input may be a simple touch of a graphic object, or an input in which at least one of the number of touches, a touch intensity (touch pressure), or a touch time for the graphic object may be greater than or equal to a reference value. Alternatively, an output mode of an additional content may be changed based on a touch input touching a menu for changing the output mode of the additional content from a full screen to a partial screen.

When an output mode of an additional content is set to a partial screen, a trigger object for setting a trigger area and a content object for setting an output area of an additional content may be simultaneously output.

It is also possible to change an output mode of an additional content whose output mode is a partial screen to a full screen. For example, when a predetermined type of touch input for deleting either a trigger object or a content object is received, or a user input for merging the trigger object and the content object is received, an output mode of an additional content may be changed from a partial screen to a full screen. Herein, the predetermined type of touch input for deleting either the trigger object or the content object may include a touch of a button for deleting the trigger object or the content object, an input in which at least one of the number of touches to the trigger object or the content object, a touch intensity (touch pressure), or a touch time is greater than or equal to a reference value, and the like. Alternatively, the output mode of the additional content may be changed based on a touch input touching a menu for changing the output mode of the additional content from a partial screen to a full screen.

Alternatively, an output mode of an additional content may be determined based on a size of a content object. For example, when a size of a content object exceeds a predefined threshold value, an output mode of an additional content may be changed from a partial screen to a full screen. Conversely, when a size of a content object is changed to less than a predefined threshold value, an output mode of an additional content may be changed from a full screen to a partial screen. Herein, the size of the content object represents at least one of a width or a height of a content object.

FIG. 5 is a diagram illustrating an example of setting a trigger area and an output area of an additional content.

The left drawing of FIG. 5 shows an example of setting a trigger area and an output area of an additional content in a document in an edit mode, and the right drawing of FIG. 5 shows an example in which a trigger area and an output area of additional content are identified and displayed in a viewer mode.

For convenience of description, it is assumed that an initial additional content is set to be output in a full screen.

When an additional content is set to be displayed in a full screen, a control unit 180 may output a graphic object 510 for setting a trigger area 530 as in the example shown in FIG. 5A.

Thereafter, when an output mode of an additional content is changed from a full screen to a partial screen, a control unit 180 may control a new graphic object 520 to be output while maintaining an output of a graphic object 510. An existing graphic object 510 may be used to set either a trigger area 530 or an output area 540 of an additional content, and a new graphic object 520 may be used to set the other.

For example, when an output mode of an additional content is a full screen, a graphic object 510 is used to set a trigger area 530, while the output mode of the additional content is changed to a partial screen, the graphic object 510 may be used to set an output area 540 of the additional content. As an output mode of an additional content is changed to a partial screen, a graphic object 520 that is newly output may be used to set a trigger area 530.

Alternatively, on the contrary, even after an output mode of an additional content is changed to a partial screen, an existing graphic object 510 may be used to set a trigger area 530. In this case, a graphic object 520 that is newly output may be used to set an output area 540 of an additional content.

In this embodiment, it is assumed that an existing graphic object 510 is used to set a content area, and a graphic object 520 that is newly output is used to set a trigger area 530. In addition, a graphic object 520 used to set a trigger area 530 is referred to as a trigger object, and a graphic object 510 used to set an output area 540 of a content is referred to as a content object.

A trigger object 520 and a content object 510 may be an image representing an additional content, an image corresponding to a type of the additional content, a polygonal image, or the like. In this case, it is preferable that the first graphic object 520 and the second graphic object 510 are different images.

A control unit 180 may set a location and/or size of a trigger area 530 based on a location and/or size of a trigger object 520, and may set a location and/or size of an output area 540 of an additional content based on a location and size of a content object 510. For example, as a location and/or size of a trigger object 520 is changed, a location and/or size of a trigger area 530 may be changed, and as a location and/or size of a content object 510 is changed, a location and/or size of an output area 540 of an additional content may be changed. In the example shown in FIGS. 5B and 5C, it is illustrated that a location and size of a trigger area 530 is determined according to a location and size of a trigger object 520, and a location and size of an output area 540 of an additional content is determined according to a location and size of a content object 510.

A control unit 180 may determine an aspect ratio of an output area of an additional content according to an aspect ratio of an additional content. That is, in order to suppress distortion that occurs when an additional content is output in accordance with an output area of an additional content, a control unit 180 may control an aspect ratio of an output area of an additional content to be maintained equal to an aspect ratio of an additional content. Accordingly, when a width of a content object is changed, a control unit 180 may control a height of the content object to also be changed according to an aspect ratio of an additional content. Likewise, when a height of a content object is changed, a control unit 180 may control a width of the content object to also be changed according to an aspect ratio of an additional content. When a user input for simultaneously adjusting a width and a height of a content object is received, a control unit 180 may adjust the width and the height of the content object according to an aspect ratio of an additional content. In this case, a width and a height of a content object may be adjusted based on any one of a width change value or a height change value obtained by a user input set as a default, or based on any one having a larger change width among the width change value and the height change value.

Whether to set an aspect ratio of an output area of an additional content equal to that of the additional content may be adjusted according to a user setting.

If a size of a trigger area is small, it becomes difficult for a user to find the trigger area in a viewer mode, and if a size of an output area of an additional content is small, it may be difficult to accurately check contents of the additional content. Accordingly, a control unit 180 may prevent a size of a trigger area and/or an output area of an additional content from becoming less than or equal to a predefined size. As an example, even if a user input for making a size of a trigger object for setting a trigger area smaller than a predefined size is received, a control unit 180 may control the size of the trigger object not to be smaller than the predefined size. Likewise, even if a user input for making a size of a content object for setting an output area of an additional content smaller than a predefined size is received, a control unit 180 may control the size of the content object not to be smaller than the predefined size.

Setting a trigger area and setting an output area of an additional content may be mutually independent. That is, changing a location and/or size of a trigger object used to set a trigger area may be independent from changing a location and/or size of a content object used to set an output area of an additional content. Accordingly, even if a location and/or size of a trigger object is changed, a location and/or size of a content object may not be changed.

As another example, setting of a trigger area and setting of an output area of an additional content may be mutually dependently set. That is, a location and/or size of an output area of an additional content may be determined dependently on a location and/or size change of a trigger area, and a location and/or size of the trigger area may be determined dependently on a change in the location and/or size of the content area. Accordingly, when changing a location and/or size of a trigger object used to set a trigger area, a location and/or size of a content object used to set an output area of an additional content may also be changed.

FIG. 6 is a diagram illustrating an example of setting a trigger area and an output area of an additional content.

In FIG. 6, it is assumed that a graphic object 620 functions as a trigger object and a graphic object 610 functions as a content object.

When an output area of a content and a trigger area are set mutually dependently, changing a location and/or size of either a trigger object or a content object may affect the other.

For example, as in an example shown in FIGS. 6A and 6B, when a location of a trigger object 620 is changed by ($\Delta x$, $\Delta y$), a location of a content object 610 may also be changed by ($\Delta x$, $\Delta y$). As a location of a trigger object 620 is changed by ($\Delta x$, $\Delta y$), a location of a trigger area 630 may also be changed by ($\Delta x$, $\Delta y$), and as a location of a content object 610 is changed by ($\Delta x$, $\Delta y$), a location of an output area 640 of an additional content may also be changed by ($\Delta x$, $\Delta y$).

For example, as in an example shown in FIG. 6C, when a size of a trigger object 620 is changed by ($\Delta w$, $\Delta h$), a size of a content object 610 may also be changed by ($\Delta w$, $\Delta h$). As the size of the trigger object 620 is changed by ($\Delta w$, $\Delta h$), a size of a trigger area 630 may also be changed by ($\Delta w$, $\Delta h$), and as the size of the content object 610 is changed by ($\Delta w$, $\Delta h$), a size of an output area 640 of an additional content may also be changed by ($\Delta w$, $\Delta h$).

In consideration of a size ratio between a trigger area (or a trigger object) and an output area of an additional content (or a content object), a location and/or size change amount of the output area (or the content object) of the additional content caused by a change in the location and/or size of the trigger area (or the trigger object) may be adjusted. For example, when a size ratio between a trigger area and an output area of an additional content is 1:N, in response to a size of the trigger area being changed by (Δw, Δh), a size of the output area of the additional content may be changed by (NΔw, NΔh).

Whether to set a trigger area and an output area of an additional content independently or dependently from each other may be determined by a user setting. For example, while a trigger area and an output area of an additional content are set independently of each other, even if a location and/or size of a trigger object is changed, a location and/or size of a content object may not be changed. On the other hand, if a setting is changed so that a trigger area and an output area of an additional content are mutually dependent, in response to a change in a location and/or size of a trigger object, a location and/or size of a content object may be changed.

A plurality of additional contents may be linked to one trigger area. For example, when setting a trigger area for a selected additional content after selecting the additional content, when a trigger area already linked to another additional content is selected, a plurality of additional contents may be linked to one trigger area.

FIG. 7 is a diagram illustrating an example in which a plurality of additional contents is linked to one trigger area.

For convenience of description, as in the example shown in FIG. 7A, it is assumed that a first additional content 715 and a first trigger object 710 linked to the first additional content 715 already exist in a main content.

When a second additional content 725 to be inserted into a main content is selected, as in the example illustrated in FIG. 7B, a control unit 180 may output a second trigger object 720 for setting a second trigger area to be linked with the second additional content 725. In this case, as in the example shown in FIG. 7C, when a user input for changing a location of a second trigger object 720 inside a first trigger object 710 is received, as in the example shown in FIG. 7D, a control unit 180 may control to output a menu for determining whether to merge a second trigger area for a second additional content 725 with the first trigger area.

When a user input for determining to merge a second trigger area with a first trigger area is received, as in the example shown in FIG. 7E, a control unit 180 may stop outputting a second trigger object 720 and may additionally link a second additional content 725 to the first trigger area. That is, when it is set to merge a first trigger area and a second trigger area, setting of the second trigger area for a second additional content may be terminated. A first additional content and a second additional content may be associated with a first trigger area set by a first trigger object 710.

On the other hand, when a user input for determining not to merge a second trigger area with a first trigger area is received, a control unit 180 may set the second trigger area for a second additional content based on a location and/or size of a second trigger object 720.

In FIG. 7, when a user input for dragging a graphic object to an inside of a first trigger object is received, a menu for selecting whether to merge the first trigger area and a second trigger area is output, but the present disclosure is not limited thereto. For example, when it is determined to insert a second additional content into a main content, before outputting a second trigger object, a menu for selecting whether to merge a first trigger area and a second trigger area may be output.

Alternatively, a control unit 180 may determine whether a first trigger area and a second trigger area can be merged according to whether a first additional content and a second additional content are of the same type. For example, only when a first additional content and a second additional content are of the same type, a first trigger area and a second trigger area may be set to be mergeable. On the other hand, when a first additional content and a second additional content are of different types, even if a second trigger object is dragged over a first trigger object, the first trigger area and the second trigger area may not be merged.

Alternatively, a control unit 180 may determine whether a first trigger area and a second trigger area can be merged, based on a size of a trigger area, and/or an output mode of an additional content or a size of an output area of an additional content. For example, when a size difference or a size ratio between a first trigger area and a second trigger area exceeds a predefined threshold value, even if a second trigger object for setting the second trigger area is dragged over the first trigger area, the first trigger area and the second trigger area may not be merged. Alternatively, when an output mode of a first additional content and a second additional content are different (e.g., when the output mode of the first additional content is a partial screen and the output mode of the second additional content is a full screen), even if a second trigger object is dragged over a first trigger object, the first trigger area and the second trigger area may not be merged.

In addition to the example shown in FIG. 7, when a plurality of additional contents is simultaneously selected, an integrated trigger area for simultaneously selected additional contents may be set. That is, when a plurality of additional contents is simultaneously inserted into a main content, one trigger object for setting an integrated trigger area for a plurality of additional contents may be output, and the integrated trigger area for the plurality of the additional contents may be determined based on a location and/or size of the trigger object.

Alternatively, when a predetermined type of touch input is input to a previously inserted trigger object, a sub-menu for selecting an additional content to be additionally linked to the trigger area may be output. Herein, the predetermined type of touch input may mean that the trigger object is touched, or may mean an input in which at least one of the number of pointers, a touch strength (touch pressure), and a touch time for touching the trigger object is greater than or equal to a reference value.

FIG. 8 is a diagram illustrating an example in which a plurality of additional contents is linked to a trigger object using a sub-menu.

When a touch input touching a trigger object 810 is received, a control unit 180 may control a sub-menu 820 related to a trigger object 810 to be output, as in an example shown in FIG. 8A.

In a sub-menu 820 shown in FIG. 8A, an additional item 821 is for executing a command for additionally linking an additional content to a trigger object 810. A delete item 822 is for executing a command for deleting a trigger object 810 on a main content.

When an additional item is selected, a control unit 180 may output a menu for selecting an additional content to be additionally linked to a trigger object 810 or execute a content list for selecting an additional content or an application/input window for generating an additional content. A selection of an additional content may follow an embodiment described based on FIG. 3.

When a plurality of additional contents is linked to one trigger object 810, a control unit 180 may identify and display that a plurality of additional contents is linked to an trigger object 810. As an example, a control unit 180 may output at least one of information indicating that a plurality of additional contents is linked to a trigger object 810 or information 815 indicating the number of additional contents linked to a trigger object 810. (See FIG. 8B).

In addition, it is possible to output a list of additional contents for identifying a plurality of additional contents around a trigger object. A list of additional contents may include an object corresponding to each additional content. Accordingly, the number of objects may be the same as the number of additional contents linked to the trigger object. Herein, the object may be an image representing each additional content or an image representing the type of each additional content.

A plurality of objects may be arranged in a line along a vertical or horizontal direction. Alternatively, a plurality of objects may be distributed and placed near the boundary of a trigger area of a plurality of objects. For example, a first object may be placed adjacent to a first border of a trigger area, and a second object may be placed adjacent to a second border of a trigger area.

The location and/or size of each object may be adjusted by a user input.

When a plurality of additional contents is linked to one trigger area, a control unit 180 may set a priority for a plurality of additional contents. A priority may be used to determine an output order of additional contents in a viewer mode.

A priority may be determined by a user setting, and may be determined based on at least one of an order of insertion into a main content, a type of an additional content, an output mode of the additional content, or a size of the additional content. For example, a control unit 180 may determine a priority of additional contents in an order of insertion into a main content. That is, an additional content first inserted into a main content may have a higher priority than an additional content later inserted into the main content. Alternatively, in consideration of types of additional contents, a first type of additional content may be set to have a higher priority than a second type of additional content. Alternatively, among additional contents, an additional content whose output mode is a full screen may be set to have a higher priority than an additional content whose output mode is a partial screen, or an additional content having a large size of an output area may be set to have a higher priority than an additional content having a small size of an output area. The determined priority may be changed according to a user setting. A plurality of additional contents may be set to have the same priority.

One additional content may be linked to a plurality of trigger areas. As an example, when a user input for adding a trigger area for an additional content is received, a plurality of graphic objects for setting a plurality of trigger areas may be output.

FIG. 9 is a diagram illustrating an example of setting a plurality of trigger areas for one additional content.

When an additional content to be inserted into a main content is selected, as in the example illustrated in FIG. 9A, a control unit 180 may output a trigger object (hereinafter referred to as a first trigger object 810) for setting a trigger area for an additional content.

In this state, when a user input for adding a trigger area is received, as in the example illustrated in FIG. 9B, a control unit 180 may further output a trigger object (hereinafter, referred to as a second trigger object 820) for setting an additional trigger area.

A first trigger object 910 is used to set a first trigger area 915 for an additional content, and a second trigger object 920 may be used to set a second trigger area 915 for the additional content. That is, a control unit 180 may set the first trigger area based on a location and/or size of the first trigger object 910, and may set the second trigger area based on a location and/or size of the second trigger object 920.

Setting a first trigger area and setting a second trigger area may be mutually dependently set. That is, when a location and/or size of a first trigger area changes, a location and/or size of a second trigger area may also be set to change. Accordingly, when a location and/or size of a first trigger object used to set a first trigger area is changed, a location and/or size of a second trigger object used to set a second trigger area may also be changed.

A control unit 180 may set functions of a first trigger area and a second trigger area to be the same or differently. For example, a control unit 180 may set both a first trigger area and a second trigger area to have a purpose of outputting an additional content and a purpose of stopping an output of an additional content in a viewer mode. Alternatively, a control unit 180 may set a first trigger area to have a purpose of outputting an additional content in a viewer mode, and may set a second trigger area to have a purpose of stopping an output of an additional content in the viewer mode.

Alternatively, at least one of a first trigger area and a second trigger area may be set to have a purpose of outputting an additional content and stopping an output of an additional content, the other may be set to have a control purpose such as zooming in, playing, or pausing an additional content.

When a plurality of additional contents is inserted into a main content, a plurality of trigger areas may exist. In this case, a control unit 180 may determine whether to allow overlapping arrangement of trigger areas based on a user setting. When overlapping arrangement between trigger areas is not allowed, a newly added trigger area may be smaller as much as a portion overlapped with an existing trigger area, or the location may be automatically changed so as not to overlap with the existing trigger area.

FIG. 10 is a diagram illustrating an operation of a terminal when a plurality of trigger areas is overlapped and arranged.

When overlapping arrangement of trigger areas is allowed, as in the example shown in FIG. 10A, a first trigger object 1010 for setting a first trigger area 1015 and a second trigger object 1020 for setting a second trigger area 1025 may be overlapped. In this case, an area where the first trigger object 1010 and the second trigger object 1020 overlap may be the first trigger area 1015 or the second trigger area 1025. For the overlapping area, a priority between the trigger areas may be determined. A priority may be used to determine an output order of additional contents in a viewer mode.

A priority may be determined by a user setting, and may be determined based on at least one of a setting order of trigger areas, a size of trigger area, a type of an additional content linked to each trigger area, an output mode of the additional content, or a size of the additional content. For example, a control unit 180 may determine a priority of trigger areas in an order of insertion into the main content. That is, a trigger area added to a main content first may have a higher priority than a trigger area inserted into the main content later. Alternatively, in consideration of types of additional contents linked to each trigger area, a trigger area to which a first type of additional content is linked may be set to have a higher priority than a trigger area to which a second type of additional content is linked. Alternatively, among additional contents, a trigger area linked to an additional content whose output mode is a full screen may be set to have a higher priority than a trigger area linked to an additional content whose output mode is a partial screen, or a trigger area linked to an additional content having a large output area may be set to have a higher priority than a trigger area linked to an additional content having a smaller output area. The determined priority may be changed according to a user setting. A plurality of trigger areas may be set to have the same priority.

On the other hand, when overlapping arrangement of trigger areas is not allowed, it may not be allowed to overlap a first trigger object 1010 for setting a first trigger area 1015 and a second trigger object 1020 for setting a second trigger area 1025. As an example, as in the example shown in FIG. 10B, when a second trigger object 1020 is moved over a first trigger object 1010, a control unit 180 may automatically change a location of the second trigger object 1020 to an area that does not overlap with the first trigger object 1010.

Alternatively, when overlapping arrangement of trigger areas is not allowed, a control unit 180 allows overlapping arrangement of a first trigger object 1010 and a second trigger object 1020, but any one of the first trigger area 1015 and the second trigger area 1025 may be controlled to decrease by an overlap amount of the first trigger object 1010 and the second trigger object 1020. That is, the overlapping area of the first trigger object 1010 and the second trigger object 1020 may be used only as a first trigger area 1015 or may be used only as a second trigger area 1025. For example, if a second trigger object 1020 is moved over a first trigger object 1010, as in the example shown in FIG. 10C, a control unit 180 may set a second trigger area 1025 by removing an overlapping portion of the first trigger object 1010 and the second trigger object 1020 from the second trigger object 1020.

At least a part of an additional content already inserted in a main content may be set as a trigger area for a new additional content. For example, at least a partial area of a first additional content may be set as a trigger area for outputting a second additional content different from the first additional content. In other words, in a viewer mode, a trigger area to which a first additional content is linked is used to start or end an output of a first additional content, and at least a partial area of a first additional content may be used to start or end an output of a second additional content.

FIG. 11 shows an example in which an additional content previously inserted in a main content is set as a trigger area for a new additional content.

For convenience of description, an additional content previously inserted in a main content will be referred to as a first additional content, and an additional content newly linked to the first additional content will be referred to as a second additional content.

When a predetermined user input is received in a first trigger object 1110 for setting a trigger area 1130 for a first additional content or a first content object 1120 for setting an output area 1140 of the first additional content, a control unit 180 may output a menu for outputting the second additional content to be linked to the first additional content. Herein, the predetermined input may be to touch at least one of the first trigger object 1110 or the first content object 1120, or may mean that at least one of the number of pointers, a touch strength (touch pressure), a touch number, or a touch time for touching at least one of the first trigger object 1120 or the first content object 1120 is greater than or equal to a reference value. As in the example shown in FIG. 3, the menu may be for selecting a type of the second additional content or a content list for selecting an additional content.

Alternatively, a content that satisfies a predefined condition may be automatically determined as a second additional content. Herein, the content that satisfies the predefined condition may include a content that is highly related to the first additional content, a content that is most recently added to a terminal, a content that is most recently executed, a content that has been executed in a viewer mode, and the like. A content that is highly related to a first additional content may mean a content including contents similar to a first additional content. For example, when a first additional content is an image or a video, an image or a video of a person included in a first additional content, an image or a video taken on the same date or at the same place as the first additional content may be determined as a content having high relevance to the first additional content.

Alternatively, a control unit 180 may control to output a content list including a content that is highly related to a first additional content. When a content is selected through a content list, the selected content may be determined as a second additional content.

When a second additional content is selected through the menu, a second trigger object 1150 for setting a second trigger area for a second additional content may be output. A second trigger area 1160 for a second additional content may be set through a second trigger object 1150.

A control unit 180 may output a second trigger object 1150 on a first content object 1120. In this case, a location and/or a size of a second trigger object 1150 may be determined dependently on a location and/or a size of a first content object 1120. For example, a size of a second trigger object 1150 may be set so as not to exceed a size of a first content object 1120. Alternatively, a second trigger object 1150 may be set so as not to deviate from a first content object 1120. For example, when a first direction boundary of a second trigger object 1150 is in contact with a first direction boundary of a first content object 1120, even if a pointer touching a second trigger object 1150 moves in a first direction, a second trigger object 1150 may be set to no longer move in a first direction.

As a second trigger object 1150 is output on a first content object 1120, at least a partial area of a first additional content output area 1140 overlapping a second trigger object 1150 may be set as a second trigger area 1160 for a second additional content. In other words, a first trigger area 1130 is set as an output control area of a first additional content, and a second trigger area 1160 in which a first content object 1120 and a second trigger object 1150 overlap may be set as an area for controlling an output of a second additional content.

Alternatively, an entire area of an output area of a first additional content 1140 may be set as a second trigger area 1160 for a second additional object. When an entire area of an output area of a first additional content 1140 is set as a second trigger area 1160, an output of a second trigger object 1150 for setting a second trigger area may be omitted. In this case, a location and/or a size of a second trigger area 1160 may be determined according to a location and/or a size of a first content object 1120.

A control unit 180 may output a second content object 1170 for setting an output area 1180 of a second additional content according to an output mode of a second additional content.

Alternatively, whether to output a second content object 1170 may be selectively determined based on an output mode of a second additional content. For example, when an output mode of a second additional content is a full screen, a second content object 1170 may not be output. However, when the output mode of the second additional content is a partial screen, the second content object 1170 for setting an output area 1180 of the second additional content may be output. A control unit 180 may determine an output area 1180 of a second additional content based on a location and size of a second content object 1170.

In this case, a location and/or size of an output area 1180 of a second additional content may be determined dependently on a location and/or size of an output area 1140 of a first additional content. For example, a size of an output area 1180 of a second additional content may be set not to exceed a size of an output area 1140 of a first additional content. Alternatively, a location and/or size of an output area 1180 of a second additional content may be changed as a location and/or size of an output area 1140 of a first additional content is changed.

As another example, an output area 1180 of a second additional content may be set to be the same as an output area 1140 of a first additional content. When an output area 1180 of a second additional content is set to be the same as an output area 1140 of a first additional content, an output of a second content object 1170 for setting the output area 1180 of the second additional content may be omitted.

Whether to allow at least a part of an output area of a first additional content to be used as a trigger area for a second additional content may be determined according to an output mode of the first additional content. For example, only when an output mode of a first additional content is a partial screen, a control unit 180 may allow setting at least a part of an output area of the first additional content as a trigger area for a second additional content. On the other hand, when an output mode of a first additional content is full screen, it may not be allowed to set at least a part of an output area of the first additional content as a trigger area for a second additional content.

A type of a second additional content may be determined dependently on a type of a first additional content. As an example, a type of a second additional content that can be linked to a first additional content may be limited to the same type as the first additional content. Accordingly, when a first additional content is an image, a second additional content that can be linked to a first additional content may be limited to an image.

It is also possible to set a plurality of trigger areas on an output area of a first content. For example, on a first content object, a second trigger object for setting a trigger area of a second additional content and a third trigger object for setting a trigger area of a third additional content may be output. A plurality of trigger objects may not be allowed to overlap on the first content object.

Alternatively, a control unit 180 may divide a first content object by the number of trigger objects on a first content object. Each trigger object may be set to be movable only within a designated area. For example, a second trigger object may be set to be freely movable within a first area of a first content object, and a third trigger object may be set to be freely moved within a second area of a first content object. Accordingly, a second trigger area may exist in a first area of an output area of a first additional content, and a third trigger area may exist within a second area of an output area of a second additional content. The location and/or the size of the first area and the second area may be adjusted according to a user setting. Alternatively, the location and/or the size of the first area and the second area may be determined based on a priority, an output mode, and a location or type of an output area of each additional content.

A plurality of additional contents may be linked to a trigger object that is output on a content object. When a plurality of additional contents is linked to one trigger object, a control unit 180 may set a priority among the plurality of the additional contents. A priority may be used to determine an output order of additional contents in a viewer mode. A priority may be determined by a user setting, or may be determined based on at least one of an order of insertion into a main content, a type of an additional content, an output mode of the additional content, or a size of the additional content. For example, a control unit 180 may determine a priority of additional contents in an order of insertion into a main content. That is, an additional content first inserted into a main content may have a higher priority than an additional content later inserted into the main content. Alternatively, in consideration of types of additional contents, a first type of additional content may be set to have a higher priority than a second type of additional content. Alternatively, among additional contents, an additional content whose output mode is a full screen may be set to have a higher priority than an additional content whose output mode is a partial screen, or an additional content having a large size of an output area may be set to have a higher priority than an additional content having a small size of an output area. The determined priority may be changed by a user setting. A plurality of additional contents may be set to have the same priority.

In the above-described example, a trigger area and an output area of an additional content have been illustrated as being rectangular, but the present disclosure is not limited thereto. A trigger area and/or an output area of an additional content may be set with a polygon or circle other than a rectangle.

In addition, in the above-described example, it has been exemplified that a trigger area and an output area of an additional content are set through a graphic object, but the present disclosure is not limited thereto. For example, a trigger area and/or an output area of an additional content may be set without a medium such as a graphic object. For example, when a touch input for dragging a point in a predetermined direction is received, a rectangular area having a movement trajectory of a pointer diagonally may be set as a trigger area and/or an output area of an additional content. Alternatively, when a touch input in which two pointers touch a touch screen is received, a rectangular area having two pointers as two vertices may be set as a trigger area and/or an output area of an additional content.

In the example shown in FIG. 2, it is described that a trigger area and an output area of an additional content are set in a series of order, but the present disclosure is not limited to the illustrated example. As an example, in FIG. 2, it is shown that a trigger area can be set after an additional content to be inserted into a main content is selected, but an embodiment implemented in the reverse order may also be included in the scope of the present disclosure. For example, when a setting of a trigger area is completed, the present disclosure may be implemented so that a menu for selecting an additional content to be inserted into a main content is displayed. As another example, the present disclosure may be implemented to first set an output area of an additional content and then set a trigger area.

Alternatively, setting a trigger area and setting an output area of an additional content may be processed in parallel. For example, a trigger object for setting a trigger area and a content object for setting an output area of additional content may be simultaneously output through a display unit 150.

In an edit mode, a layout setting for a trigger area and an output area of an additional content may be stored, and the stored layout may be applied to another page or another main content as it is. For example, even if a main content is changed from a PPT format file to a PDF format file, a layout set on the PPT format main content may be applied to the PDF format main content as it is. When the sizes of the main contents are different, a size of a trigger area and an additional content output area may be automatically adjusted according to a size ratio between main contents.

Next, an operation of a terminal in a viewer mode will be described.

FIG. 12 is a flow chart showing an operation of a terminal in a viewer mode.

When an edit mode is terminated, a control unit 180 may switch a terminal to a viewer mode. In a viewer mode, a setting for a trigger area and an output area of an additional content cannot be changed any more. In order to change a setting for a trigger area and an output area of an additional content, a viewer mode must be terminated and then an edit mode must be entered again.

When a terminal is switched to a viewer mode, a control unit 180 may set a trigger area and an output area of an additional content set in an initial edit mode not to be visible. That is, when a terminal is switched from an edit mode to a viewer mode, in the edit mode, a trigger area and an output area of an additional content that were visually identified by graphic objects may no longer be identified and displayed. Accordingly, when an edit mode is exited and switched to a viewer mode, only a first main content may be displayed on a display unit 160.

However, in order to prevent a user from misrecognizing a location of a trigger area, a control unit 180 may control the location of the trigger area to be identified and displayed when a predetermined user input is received.

FIG. 13 is a diagram illustrating an example in which a trigger area is visually identified and displayed.

In the example shown in FIG. 13, a dotted outline represents a trigger area. The dotted outline may be a virtual line that is not visible to a user.

When a user input for visually identifying and displaying a trigger area 1310 is received, a control unit 180 may control a trigger area 1310 to be visually identified and displayed. Herein, a user input may be a touch of a button requesting to visually identify and display a trigger area 1310 or may be a predefined type of touch input. The predefined type of touch input may mean that at least one of the number of pointers, a touch strength (touch pressure), a touch time or the number of touches for touching a main content is greater than or equal to a reference value.

As an example, when a user input of double touching a main content is received, as in the examples shown in FIGS. 13A and 13B, a control unit 180 may control a trigger area 1310 to be identified and displayed at a location of the trigger area 1310. For example, a control unit 180 may control an object 1320 for identifying a trigger area 1310 to be output on the trigger area 1310. The object 1320 may include at least one of a trigger object used to set a trigger area 1310, a pre-stored icon, or an image representing an outline of the trigger area.

In this case, in order to prevent an object 1320 identifying a trigger area from covering a main content, a control unit 180 may set the object 1320 to a semi-transparent state.

A control unit 180 may control an object 1320 to be output for a predetermined time, or control the object 1320 to blink and be output. Alternatively, it is possible to control an object 1320 to be output while a user input is maintained. For example, while a pointer touches a touch screen, an object 1320 may be output, and when the touch input of the pointer is released, the output of the object 1320 may be stopped. Alternatively, when a user input requesting to stop outputting an object 1220 is received, a control unit 180 may stop outputting the object 1220.

When a touch input touching a main content is received (S1210) and a location of the received touch input corresponds to an inside of a trigger area (S1220), a control unit 180 may control an additional content linked to the trigger area to be output. In this case, according to an output mode of an additional content, a control unit 180 may output the additional content in a full screen or a partial screen (S1230, S1240, S1250). Herein, the partial screen may correspond to an output area of an additional content set in an edit mode. When an additional content is output in a partial screen, the additional content may be overlaid on a part of the main content.

FIG. 14 is a diagram illustrating an example in which an additional content is output in response to a user input touching a trigger area.

For convenience of explanation, it is assumed that two trigger areas are inserted on a main content, and a location and size of each trigger area follow the example shown in FIG. 14A. In addition, it is assumed that an additional content linked to a first trigger area 1410 is a first image 1415 and an additional content linked to a second trigger area 1420 is a second image 1425.

When a user input touching a main content is received and a location of the received touch input corresponds to an inside of a trigger area, a control unit 180 may control to output an additional content linked to the trigger area selected by the touch input. For example, when a location of a touch input is inside a first trigger area 1410, a control unit 180 may control a first image 1415 linked to a first trigger area 1410 to be output. In this case, when an output mode of an additional content linked to a first trigger area 1410 is a full screen, a control unit 180 may control a first image 1415 to be output in a full screen in response to a user input touching the first trigger area 1410.

On the other hand, when a location of a touch input is inside a second trigger area 1420, a control unit 180 may control a second image 1425 linked to the second trigger area 1420 to be output. In this case, when an output mode of an additional content linked to a second trigger area 1420 is a partial screen, a control unit 180 may control a second image 1425 to be output in a partial screen in response to a user input touching the second trigger area 1420. Specifically, a control unit 180 may control a second image 1425 to be output through an output area of an additional content set in an edit mode.

When an additional content linked to a trigger area is a multimedia file output by playing a video or a music, in response to a user input touching the trigger area, a control unit 180 may control a multimedia player for playing the additional content such as video or music to be output in a full screen or a partial screen. A user may control to play an additional content such as a video or a music through a multimedia player.

However, when an additional content is output, since a content of a main content is covered by the additional content, a control unit 180 may control to output the additional content in a semi-transparent state, or may control the additional content to be converted to a translucent state after a certain amount of time has elapsed since the additional content was displayed.

When an output mode of an additional content is a partial screen, a control unit 180 may set a size of the additional content according to a size of an output area of the additional content. In this case, when a width of an additional content is larger than the height and a width of an output area of the additional content is set to be smaller than the height, distortion of the additional content output through the output area of the additional content may occur. In order to solve the above problem, a control unit 180 may rotate and output an additional content in consideration of a width and height ratio of the additional content and a width and height ratio of an output area of the additional content. For example, when a width of an additional content is smaller than the height and a width of an output area of the additional content is greater than the height, and/or when the width of the additional content is larger than the height and the width of the output area of the additional content is smaller than the height, a control unit 180 may rotate and output the additional content.

FIG. 15 is a diagram illustrating an example in which an additional content is rotated and output.

As in the example shown in FIG. 15A, when an additional content 1530 linked to a trigger area 1510 is an image whose width is greater than the height and a width of an output area of the additional content is less than the height, in response to a user input touching a trigger area 1510, through the output area 1520 of the additional content, a control unit 180 may output the additional content 1530 rotated by 90 degrees. In this case, the rotation direction (e.g., clockwise or counterclockwise) of the additional content may be determined by a user setting in an edit mode.

In a state in which an additional content is being output, when a touch input is received and a location of the touch input is inside a trigger area or an output area of the additional content, a control unit 180 may stop outputting the additional content (S1260, S1270, S1280). That is, after an additional content is output, when a user input touching a trigger area or the additional content is received, an output of the additional content that was overlaid on a main content may be terminated.

FIG. 16 is a diagram illustrating an example in which an output of an additional content is terminated.

FIG. 16A is a diagram illustrating a trigger area 1610 and an output area 1620 of an additional content.

When a touch input is received while additional content is being output and a location of the touch input is inside a trigger area 1610, as in the example shown in FIG. 16B, a control unit 180 may end an output of the additional content. Although not shown, even when a touch input touching an additional content that is overlaid on a main content is received, an output of the additional content may be terminated.

When a predetermined condition is satisfied, a control unit 180 may end an output of an additional content.

As an example, when a preset time has elapsed since an additional content was output, a control unit 180 may terminate the output of the additional content. Herein, the preset time may be adjusted by a user setting in an edit mode.

As an example, when a first additional content linked to a first trigger area is being output and a user input for selecting a second trigger area linked to a second additional content is received, a control unit 180 may stop the output of the first additional content and control the second additional content to be output.

Alternatively, when a user input of flicking a pointer touching an additional content is received, a control unit 180 may terminate an output of the additional content.

In the above example, it has been described that an output of an additional content is terminated in response to a user input touching a trigger area or an output area of the additional content. However, in response to the user input touching the trigger area or the output area of the additional content, a setting related to the output of the additional content may be changed. Herein, the setting related to the output may include at least one of adjusting a size of an additional content (e.g., expanding/reducing), adjusting a transparency of the additional content, or controlling a playback of the additional content (e.g., playing, pausing, and stopping).

For example, when a first type of touch input that touches a trigger area or an output area of an additional content is received, an output of the additional content is set to end. However, when a second type of touch input that touches the trigger area or the output area of the additional content is received, a setting related to the output of the additional content may be adjusted. For example, when a second type of touch input that touches a trigger area or an output area of an additional content is received, the additional content displayed over a main content may be enlarged or reduced, or a transparency of the additional content displayed over the main content may be adjusted. Herein, the first type and the second type of touch input may be different in at least one of the number of pointers, a touch strength (touch pressure), a touch time, or the number of touches.

Alternatively, an output of an additional content may be terminated in response to a user input touching a trigger area, while a setting related to the output of the additional content may be changed in response to a user input touching an output area of the additional content. For example, when a user input touching an output area of an additional content is received, the additional content displayed over a main content may be enlarged or reduced, or a transparency of the additional content displayed over the main content may be adjusted.

When a plurality of trigger areas is linked to one additional content, each of the plurality of trigger areas may be used to control output and end of the output of the additional content. As an example, when two trigger areas are linked to one additional content, an output of the additional content may be started or terminated by a user input touching the first trigger area, or the output of the additional content may be started or terminated by a user input touching the second trigger area.

Alternatively, when one additional content is linked to a plurality of trigger areas, different functions may be set to be assigned to each of the plurality of trigger areas. For example, when two trigger areas are linked to one additional content, an output of the additional content may be performed in response to receiving a user input touching a first trigger area, while the output of the additional content may be terminated in response to receiving a user input touching a second trigger area.

Alternatively, at least one of a plurality of trigger areas may be used to start or end output of an additional content, while the rest may be used to change a setting related to the output of the additional content. As an example, when two trigger areas are linked to one additional content, in order to start or end an output of an additional content, a user input touching a first trigger area may be received. However, in order to change a setting related to the output of the additional content, a user input touching a second trigger area may be received.

When an overlapped area exists between a plurality of trigger areas and a user input touching the overlapped area of the plurality of trigger areas is received, a control unit 180 may select any one of the plurality of the trigger areas based on a priority between the trigger areas or a touch type.

FIG. 17 is a diagram illustrating an operation of a terminal when a user input touching an area in which a plurality of trigger areas is overlapped is received.

As in the example shown in FIG. 17A, a part of a first trigger area 1710 and a part of a second trigger area 1720 are overlapped, and it is assumed that a first additional content 1715 and a second additional content 1725 are linked to the first trigger area 1710 and the second trigger area 1720 respectively.

When a touch input touching a portion where a first trigger area 1710 and a second trigger area 1720 overlap is received, a control unit 180 may select a trigger area having the highest priority among the first trigger area 1710 and the second trigger area 1720. For example, when a priority of a first trigger area 1710 is higher than a priority of a second trigger area 1720, a control unit 180 may determine that the first trigger area 1710 is selected by a user input touching a portion where the first trigger area 1710 and the second trigger area 1720 overlap. Accordingly, as in the example shown in FIG. 17B, a first additional content 1715 linked to a first trigger area 1710 may be output. In a state in which a first additional content 1715 is being output, when a user input touching a portion where a first trigger area 1710 and a second trigger area 1720 overlap is received, a control unit 180 may determine that the first trigger area 1710 having a higher priority than the second trigger area 1720 is selected. Accordingly, as in the example illustrated in FIG. 17C, an output of a first additional content 1715 may be terminated.

A priority between trigger areas may be determined by a user setting in an edit mode. Alternatively, it may be determined based on at least one of an order in which trigger areas are set in an edit mode, a type of an additional content linked to each trigger area, an output mode of the additional content, or a size of the additional content.

When an output of an additional content linked to any one of a plurality of trigger areas starts and/or ends, a priority of a trigger area to which the additional content is linked may be changed to the lowest priority. For example, in the example shown in FIG. 17, when an output of a first additional content 1715 linked to a first trigger area 1710 is terminated, a control unit may set a priority of the first trigger area 1710 to be lower than a priority of the second trigger area 1720. Accordingly, when a user input touching a portion where a first trigger area 1710 and a second trigger area 1720 overlap is received, as in the example shown in FIG. 17D, a control unit 180 may determine that the second trigger area 1720 is selected and may control an output of a second additional content 1725 linked to the second trigger area 1720 to start.

As another example, when a user input touching a portion where a first trigger area 1710 and a second trigger area 1720 overlap while a first additional content 1715 is being output is received, a control unit 180 may control an output of a second additional content 1725 to start while terminating an output of a first additional content 1715.

In the example shown in FIG. 17, when a user input touching a portion where a plurality of trigger areas overlap is received, it is illustrated that any one of the plurality of trigger areas is selected according to a priority between the trigger areas, but any one of the plurality of trigger areas may be set to be selected according to a type of the touch input. For example, when a first type of touch input is received in a portion where a first trigger area and a second trigger area overlap, it may be determined that the first trigger area is selected, whereas when a second type of touch input is received, it may be determined that the second trigger area is selected. Herein, the first type of touch input and the second type of touch input may be different in at least one of the number of pointers, a touch strength (touch pressure), a touch time, and the number of touches.

As another example, when a user input touching a portion where a plurality of trigger areas overlap is received, it may be determined that the plurality of trigger areas is simultaneously selected. For example, when a user input touching a portion where a first trigger area and a second trigger area overlap is received, a control unit 180 may select both the first trigger area and the second trigger area. Accordingly, an output of a first additional content linked to a first trigger area may start or end, and an output of a second additional content linked to the first trigger area may start or end.

When a plurality of additional contents is associated with one trigger area, a control unit 180 may output a list of additional contents linked to the trigger area in response to a user input touching the trigger area. When any one of additional contents in the list is selected, a control unit 180 may control the selected additional content to be output.

FIGS. 18 and 19 are diagrams illustrating an example in which a list of additional contents is output in response to a user input touching a trigger area.

As in the example shown in FIG. 18A, it is assumed that a first additional content 1815 and a second additional content 1825 are linked to a trigger area 1810.

When a touch input for touching a trigger area 1810 is received, a control unit 180 may output a list 1830 of additional contents linked to the trigger area. The list 1830 may include a representative image of each additional content. Herein, the representative image may include at least one of a thumbnail or a preview image.

When any one item is selected in a list 1830 of additional contents, a control unit 180 may output an additional content corresponding to the selected item. For example, when a first additional content item 1832 is selected from a list 1830 of additional contents, the first additional content 1815 may be output. (See FIG. 18C)

When a user input touching a trigger area 1810 is received while at least one additional content is being output, a control unit 180 may output a list 1830 of additional contents again.

When an additional content item that is already in an output state is selected from a re-output a list 1830 of additional contents, a control unit 180 may terminate the output of the additional content. For example, when a first additional content item 1832 is selected in a list 1830 of additional contents, output of the first additional content 1815 may be stopped. (See FIG. 19B)

When an additional content item different from the additional content that is already in the output state is selected in the re-output additional content list 1830, a control unit 180 may additionally output the selected additional content. For example, when a second additional content item 1834 is selected from a list 1830 of additional contents, a second additional content 1825 may be additionally output. (See FIG. 19C)

When an additional content item different from an additional content that is already in the output state is selected in a re-output list 1830 of additional contents, a control unit 180 may additionally output the selected additional content. For example, when a second additional content item 1834 is selected from a list 1830 of additional contents while a first additional content is being output, a second additional content 1825 may be output while terminating the output of the first additional content 1815.

As another example, a re-output list of additional contents may be set to not include an additional content item that is already being output. For example, when a touch input for touching a trigger area is received while a first additional content is being output, a list of additional contents excluding a first additional content item may be output.

As another example, when a plurality of additional contents is linked to one trigger area, a control unit 180 may start or end an output of an additional content having a high priority in response to a user input touching the trigger area.

FIG. 20 is a diagram illustrating an operation of a terminal when a user input touching a trigger area to which a plurality of additional contents is linked is received.

As in the example shown in FIG. 20A, it is assumed that the first additional content 2015 and the second additional content 2025 are linked to the trigger area 2010.

When a touch input touching a trigger area 2010 is received, a control unit 180 may control an additional content having the highest priority among a first additional content 2015 and a second additional content 2025 linked to the trigger area to be output. For example, when a priority of a first additional content 2015 is higher than a priority of a second additional content 2025, as in the example shown in FIG. 20B, in response to a user input touching a trigger area 2010, a control unit 180 may output the first additional content 2015. When a touch input touching a trigger area 2010 is received while a first additional content 2015 is being output, as in the example shown in FIG. 20C, a control unit 180 may finish outputting the first additional content 2015.

A priority between additional contents may be determined by a user setting in an edit mode. Alternatively, in an edit mode, it may be determined based on at least one of an order in which additional content is inserted into a main content, a type of the additional content, an output mode of the additional content, or a size of the additional content.

When an output of an additional content that was previously output is terminated, a priority of the additional content may be changed to the lowest priority. As an example, in the example shown in FIG. 20, when an output of a first additional content 2015 is terminated, a priority of the first additional content 2015 may be set to be lower than a priority of a second additional content 2025. Accordingly, when a user input touching a trigger area 2010 is received, as in the example shown in FIG. 20D, a control unit 180 may control an output of a second additional content 2025 to start.

As another example, when a user input touching a trigger area 2010 is received while a first additional content 2015 is being output, a control unit 180 may control an output of a second additional content 2025 to start while terminating the output of the first additional content 2015.

As another example, when a user input touching a trigger area 2010 is received while a first additional content 2015 is being output, a control unit 180 may control an output of a second additional content 2025 to start while maintaining the output of the first additional content 2015. When a user input touching a trigger area 2010 is received while all additional contents linked to the trigger area 2010 is being output, a control unit 180 may terminate the output of all the additional contents linked to the trigger area 2010.

A priority of a plurality of additional contents may be the same. As an example, when a first additional content and a second additional content have the same priority, in response to a user input touching a trigger area, a control unit 180 may start or end an output of the first additional content and also start or end an output of the second additional content.

As in the illustrated example, a list of additional contents may include an object corresponding to each additional content. The number of output objects may be the same as the number of additional contents linked to a trigger object. An object may be an image representing each additional content or an image representing a type of each additional content.

A plurality of objects may be arranged in a line along a vertical or horizontal direction. Alternatively, a plurality of objects may be distributed and placed adjacent to a boundary of a trigger area of the plurality of objects. For example, a first object may be placed adjacent to a first border of a trigger area, and a second object may be placed adjacent to a second border of the trigger area.

According to the number of times the trigger area is touched, an additional content to be output may be selected in response to a touch input touching the trigger area. For example, when a touch input for touching an additional content once is received, a first additional content may be output, and when a touch input for touching the additional content twice is received, a second additional content may be output. That is, a touch input for touching a trigger area N times may function as calling a N-th additional content. In this case, the order of the additional contents may be determined based on the priority of the additional contents. When at least a partial area of an additional content is set as a trigger area, the trigger area may be activated only in a state in which the additional content is being output on a main content. In a state in which an additional content is being output, when a touch input for touching a trigger area corresponding to at least a partial area of the additional content is received, a control unit 180 may output an additional content linked to the trigger area in response to a user input.

FIG. 21 shows an example in which another additional content is output in response to a user input touching an additional content. For convenience of explanation, an additional content whose output starts or ends by a first trigger area 1810 will be referred to as a first additional content, and an additional content whose output starts or ends by a second trigger area corresponding to at least a partial area of a first additional content will be referred to as a second additional content. FIG. 21 shows an example in which another additional content is output in response to a user input touching an additional content. For convenience of explanation, an additional content whose output starts or ends by a first trigger area 1810 is referred to as a first additional content, and an additional content whose output starts or ends by a second trigger area corresponding to at least a partial area of a first additional content is referred to as a second additional content.

When a user input touching a first trigger area 2110 is received, as in the example shown in FIG. 21A, a control unit 180 may control a first additional content 2120 linked to the first trigger area 2110 to be output.

When a first additional content 2120 is output, a second trigger area 2130 set on the first additional content 2120 may be switched to an active state. When a touch input for touching a second trigger area 2130 (i.e., at least a partial area of a first additional content) is received while the second trigger area 2130 is activated, a control unit 180 may control an output of a second additional content 2140 linked to the second trigger area 2130. (See FIG. 21B) In this case, a second additional content 2140 may be output in a full screen or a partial screen according to an output mode of the second additional content 2140 set in an edit mode. When a second additional content 2140 is set to be output in a partial screen, a location and/or size of an output of the second additional content 2140 may be determined based on a location and/or size of an output area of the second additional content 2140 set in an edit mode.

As another example, when an output area of a second additional content 2140 is set to be the same as an output area of a first additional content 2120, the second additional content 2140 may be overlaid on the first additional content 2120.

According to a type of a touch input for a first additional content 2120, a control unit 180 may determine whether to output a second additional content 2140. For example, when a first type of touch input is input to a second trigger area 2130 on a first additional content 2120, a second additional content 2140 may be output in response to the touch input. However, when a second type of touch input is input to a second trigger area 2130 on a first additional content 2120, in response to the touch input, an output of the first additional content 2120 may be terminated or a setting related to the output of the first additional content 2120 may be changed. Herein, the first type and the second type of touch input may be different in at least one of the number of pointers, a touch strength (touch pressure), a touch time, and the number of touches.

In response to a user input touching a second trigger area 2130 or a second additional content 2140, a control unit 180 may stop outputting the second additional content 2140.

Alternatively, in response to a user input for stopping an output of a first additional content 2120, a control unit 180 may stop outputting both a first additional content 2120 and a second additional content 2140. A user input for stopping an output of a first additional content 1820 may include at least one of touching a first trigger area 2110 or touching a remaining area except for a second trigger area 2130 on a first additional content 2120.

A plurality of trigger areas may be set on a first additional content. In this case, locations of each trigger area may be different. Alternatively, an entire area of a first additional content may be set as a trigger area.

When trigger areas for a plurality of additional contents are set on a first additional content, a control unit 180 may determine an additional content to be output according to a location of a touch input touching the first additional content or a shape of the touch input. For example, when a touch input for touching a first area of a first additional content is received, a second additional content may be controlled to be output, while when a touch input touching a second area of the first additional content is received, a third additional content may be controlled to be output. Alternatively, when a first type of touch input is received for a first additional content, a second additional content may be set to be output, while when a second type of touch input is received for the first additional content, a third additional content may be set to be output.

Alternatively, a control unit 180 may select an additional content to be output based on a priority among a plurality of additional contents. For example, when a touch input touching a first additional content is received, a control unit 180 may control an additional content having the highest priority among a plurality of additional contents linked to the first additional content to be output. For example, when a priority of a second additional content is higher than that of a third additional content, the second additional content may be output in response to a touch input touching a first additional content.

When an output of an additional content linked to a first additional content is terminated, a priority of the additional content may be changed to the lowest priority. For example, when an output of a second additional content is terminated, a priority of the second additional content may be changed to a priority lower than that of a third additional content. Accordingly, when a touch input touching the first additional content is re-received, the third additional content may be output instead of the second additional content.

In a state in which an additional content is being output, when a user input for the additional content is received, a control unit 180 may change an output location and/or a size of the additional content in response to the user input. That is, even under a viewer mode, a location and/or a size of an additional content being output may be freely changed.

FIG. 22 is a diagram illustrating an example in which an output location and a size of an additional content are changed.

As in the example shown in FIG. 22A, when a user input of dragging a pointer touching an edge of an additional content 2210 in a predetermined direction is received, a control unit 180 may change a size of the additional content 2210 being output in response to the user input.

Alternatively, as in the example shown in FIG. 19B, when a user input of dragging a pointer touching an additional content 2210 in a predetermined direction is received, a control unit 180 may change a location of the additional content 2210 being output in response to the user input.

In a state in which a location and/or a size of an additional content is changed, when a predetermined user input is received, a control unit 180 may adjust a location and/or a size of the additional content according to a location and/or a size of an original additional content output area. Herein, the predetermined user input may be to touch an output area or a trigger area of an additional content, or may be a touch input in a predefined form. The predefined form may be that at least one of the number of pointers, the touch strength (touch pressure), the touch time, and the number of touches is greater than or equal to a reference value.

Even if a location and/or a size of an additional content is changed, a location and/or a size of an output area of the additional content may be maintained the same as that set in an edit mode. Accordingly, in a state in which a location and/or a size of an additional content is changed, when a user input touching a trigger area is received, an output of the additional content whose location and/or size is changed is terminated, and thereafter, when a user input for re-touching the trigger area is received, the additional content may be output in accordance with an output area of an original additional content.

Alternatively, a location and/or a size of an output area of an additional content may be changed according to a changed location and/or a changed size of the additional content. However, the changes may be maintained in effect until an event occurs. The event may include at least one of ending a viewer mode, changing a slide page, or ending a file. A location and/or a size of an output area of an additional content may be determined according to a setting in an edit mode.

Contents that have been edited under an edit mode may be stored as a single file. That is, a trigger area, an output area of an additional content, and/or a main content to which the additional content is added may be stored in a predefined file format.

A control unit 180 may generate log data that records a usage history of a main content and/or an additional content. The log data may include at least one of whether to be used as a main content, the number of times used as a main content, file information used as a main content, whether to be used as an additional content, the number of times used as an additional content, file information used as an additional content, or slice information inserted as an additional content. A control unit 180 may refer to log data and output a usage history of each content.

FIG. 23 is a diagram illustrating an example in which a usage history of each content is output.

A control unit 180 may output a content list that can be used as a main content and/or an additional content. A control unit 180 may refer to log data to output a usage history of each content included in a content list. Alternatively, when any one is selected from a content list, a control unit 180 may output a usage history for the selected content. The usage history may include the number of times a selected content was used as a main content and/or an additional content, a file name of a selected content, or a slide number (or a page number) where a selected content was used.

When a user input of touching a file name or a slide number is received, a control unit 180 may output a corresponding file or a page corresponding to a selected slide number of the corresponding file.

When outputting a content usage history, a control unit 180 may display whether the selected content has been used multiple times in one file or one slice. For example, when a selected content is used multiple times for one file or one slice, a corresponding file or a corresponding slice number may be displayed in a first format. On the other hand, a file or a slice number that does not correspond to the above condition may be displayed in a second format. The first format and the second format may be different in at least one of a font, a thickness, a color, an italics, or a size. By identifying and displaying a file and/or a slice in which the same content is cited multiple times, it is possible to minimize a user's editing error.

When outputting a content list for selecting an additional content to be added to a main content, a control unit 180 may sort contents in ascending or descending order in consideration of a usage history of each content. For example, a control unit 180 may sort and output contents in ascending order based on the number of times that each content is used as a main content and/or an additional content. Alternatively, the output is sorted in descending order based on the number of uses, but contents added to the main content currently being edited may be output in a lower order. By arranging and displaying contents based on a usage history, it is possible to block editing errors in which an additional content previously inserted in a main content is re-inserted.

Exemplary methods of the present disclosure are expressed as a series of operations for clarity of description, but this may not be intended to limit the order in which steps are performed, and if necessary, each step may be performed simultaneously or in a different order. In order to implement a method according to the present disclosure, in the exemplary steps, other steps may be additionally included, only the remaining steps excluding some steps may be included, or additional other steps may be included except for some steps.

Various embodiments of the present disclosure are not listed in all possible combinations, but they are intended to describe representative aspects of the present disclosure, and matters described in various embodiments may be applied independently or may be applied in combination of two or more.

In addition, various embodiments of the present disclosure may be implemented by hardware, firmware, software, or a combination thereof. For implementation by hardware, it may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controller, microcontroller, microprocessor, etc.

The scope of the present disclosure may include software or machine-executable instructions (e.g., operating systems, applications, firmware, programs, etc.) that allow an operation according to a method of various embodiments to be executed on a device or computer, and it may include a non-transitory computer-readable medium in which such software or instructions can be stored and executed on a device or a computer.

INDUSTRIAL AVAILABILITY

The present disclosure may be applied to various types of electronic devices capable of outputting and editing a content.

The invention claimed is:

1. A terminal, comprising: a display unit; a user input receiving unit; and a control unit configured to switch between an editing mode and a viewer mode for a main content,
wherein, under the editing mode, the control unit is configured to: set a first trigger region, linked to a plurality of additional contents, on the main content,
wherein, under the viewer mode, the control unit is configured to: output the main content on the display unit; and
in response to a first user input selecting the first trigger region on the main content, control to output a list of a plurality of preview thumbnails, wherein each preview thumbnail in the list corresponds to the respective plurality of additional contents linked to the first trigger region;
in response to receiving a second user input selecting a first preview thumbnail in
the list, the control unit is configured to output a first additional content corresponding to the selected first preview thumbnail, on the main content; and
in response to receiving a third user input selecting a second preview thumbnail in
the list, while the first additional content is output on the main content, the control unit is configured to stop outputting the first additional content and newly output a second additional content corresponding to the second preview thumbnail selected by the third user input, on the main content.

2. The terminal of claim 1, wherein the control unit generates log data recording a usage history of one or more of the plurality of additional contents.

3. The terminal of claim 2, wherein the usage history includes at least one of a number of times that the one or more of the plurality of additional contents is cited, a file name in which the one or more of the plurality of additional contents is cited, or a page number in which the one or more of the plurality of additional contents is cited.

4. A method for controlling a terminal, comprising: under an editing mode for a main content, setting a first trigger region linked to a plurality of additional contents on the main content, switching, for the main content, the editing mode to a viewer mode; and
    under the viewer mode, in response to a first user input selecting the first trigger region on the main content, controlling to output a list of a plurality of preview thumbnails, wherein each preview thumbnail in the list corresponds to the respective plurality of additional contents linked to the first trigger region;
    in response to receiving a second user input selecting a first preview thumbnail in the list, controlling to output a first additional content corresponding to the selected first preview thumbnail, on the main content; and in response to receiving a third user input selecting a second preview thumbnail in the list, while the first additional content is output on the main content, controlling to stop outputting the first additional content and newly output a second additional content corresponding to the second preview thumbnail selected by the third user input, on the main content.

5. A non-transitory computer readable recording medium for storing program instructions for controlling a terminal, the program instructions comprising:
    under an editing mode for a main content, setting a first trigger region linked to a plurality of additional contents on the main content, switching, for the main content, the editing mode to a viewer mode; and
    under the viewer mode, in response to a first user input selecting the first trigger region on the main content, controlling to output a list of a plurality of preview thumbnails, wherein each preview thumbnail in the list corresponds to the respective plurality of additional contents linked to the first trigger region;
    in response to receiving a second user input selecting a first preview thumbnail in the list, controlling to output a first additional content corresponding to the selected first preview thumbnail, on the main content; and in response to receiving a third user input selecting a second preview thumbnail in the list, while the first additional content is output on the main content, controlling to stop outputting the first additional content and newly output a second additional content corresponding to the second preview thumbnail selected by the third user input, on the main content.

\* \* \* \* \*